US010664677B2

(12) United States Patent
Lee et al.

(10) Patent No.: US 10,664,677 B2
(45) Date of Patent: May 26, 2020

(54) DISPLAY DEVICE, DISPLAY PANEL, FINGERPRINT-SENSING METHOD, AND CIRCUIT FOR SENSING FINGERPRINT

(71) Applicant: LG Display Co., Ltd., Seoul (KR)

(72) Inventors: SungYub Lee, Seoul (KR); CheolSe Kim, Daegu (KR); HongChul Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 167 days.

(21) Appl. No.: 15/841,101

(22) Filed: Dec. 13, 2017

(65) Prior Publication Data
US 2018/0173923 A1 Jun. 21, 2018

(30) Foreign Application Priority Data

Dec. 16, 2016 (KR) .................. 10-2016-0172933
Nov. 16, 2017 (KR) .................. 10-2017-0153347

(51) Int. Cl.
| | |
|---|---|
| *G06F 3/044* | (2006.01) |
| *G06K 9/00* | (2006.01) |
| *G02F 1/1333* | (2006.01) |
| *G02F 1/1345* | (2006.01) |
| *G06F 3/041* | (2006.01) |

(Continued)

(52) U.S. Cl.
CPC ....... *G06K 9/0002* (2013.01); *G02F 1/13338* (2013.01); *G02F 1/13452* (2013.01); *G06F 3/042* (2013.01); *G06F 3/044* (2013.01); *G06F 3/0412* (2013.01); *G06F 3/0416* (2013.01); *G06K 9/0004* (2013.01); *G09G 3/3266* (2013.01); *G09G 2300/0426* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2002/0054394 | A1 | 5/2002 | Sasaki et al. |
| 2017/0147850 | A1 | 5/2017 | Liu et al. |

(Continued)

FOREIGN PATENT DOCUMENTS

| | | | |
|---|---|---|---|
| CN | 101727571 A | | 6/2010 |
| CN | 104220967 A | | 12/2014 |

(Continued)

OTHER PUBLICATIONS

Combined Search and Examination Report dated Jun. 13, 2018 issued in the corresponding United Kingdom Patent Application No. GB1720782.0, pp. 1-6.

(Continued)

*Primary Examiner* — Robin J Mishler
(74) *Attorney, Agent, or Firm* — Polsinelli PC

(57) ABSTRACT

The present disclosure relates to a display device, a display panel, a fingerprint-sensing method, and a circuit for sensing a fingerprint. More particularly, the display device, the display panel, the fingerprint-sensing method, and the circuit for sensing a fingerprint may receive a signal from a data line electrically connected to a pixel electrode through a switching transistor and may detect fingerprint information after a driving voltage is applied to the pixel electrode disposed in a pixel area, thereby detecting a fingerprint without including a separate fingerprint sensor outside a display panel.

29 Claims, 37 Drawing Sheets

(51) Int. Cl.
*G06F 3/042* (2006.01)
*G09G 3/3266* (2016.01)

(52) U.S. Cl.
CPC . *G09G 2300/0814* (2013.01); *G09G 2310/08* (2013.01); *G09G 2354/00* (2013.01)

(56) References Cited

U.S. PATENT DOCUMENTS

2017/0371213 A1* 12/2017 Wang ................ G06F 3/044
2018/0150163 A1*  5/2018 Lee ................. G06F 3/0416
2018/0314379 A1* 11/2018 Shen ................ G06F 3/0416

FOREIGN PATENT DOCUMENTS

| | | |
|---|---|---|
| CN | 104881196 A | 9/2015 |
| CN | 104898314 A | 9/2015 |
| CN | 105528099 A | 4/2016 |
| CN | 106446656 A | 2/2017 |
| CN | 108121472 A | 6/2018 |
| EP | 3246801 A1 | 11/2017 |
| WO | 2018040713 A1 | 3/2018 |

OTHER PUBLICATIONS

Chinese Office Action dated Feb. 6, 2020 issued in corresponding Application No. 201711340804.6 (33 pages).

\* cited by examiner

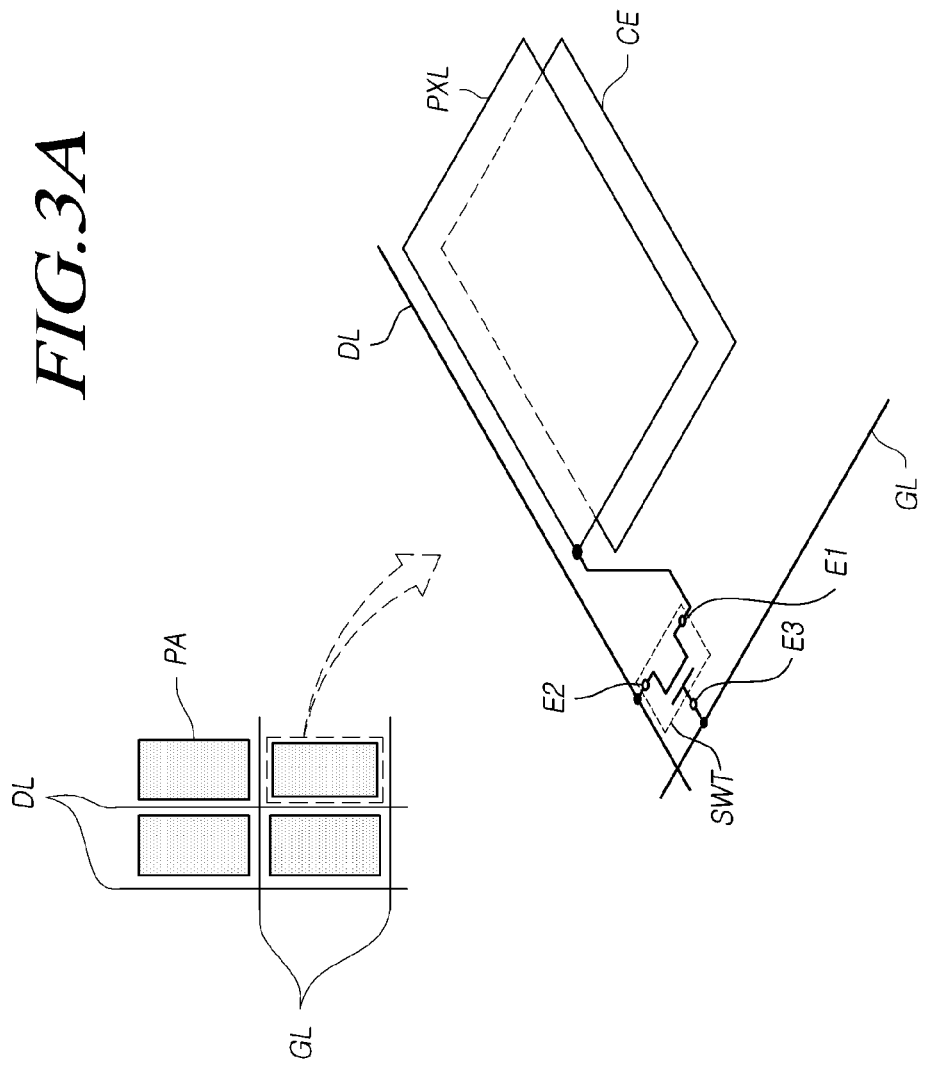

*FIG.14*

| CS1 | CS2 | DL_P+1 ~ DL_P+Q |
|---|---|---|
| 0 | 0 | DATA |
| 0 | 1 | Sensing |
| 1 | 0 | VDRV |
| 1 | 1 | — |

FIG.17

| CS1 | CS2 | DL_P+1 ~ DL_P+Q |
|---|---|---|
| 0 | 0 | DATA |
| 0 | 1 | Sensing |
| 1 | 0 | VDRV |
| 1 | 1 | VREF |

DISPLAY DEVICE, DISPLAY PANEL, FINGERPRINT-SENSING METHOD, AND CIRCUIT FOR SENSING FINGERPRINT

CROSS-REFERENCE TO RELATED APPLICATIONS

This application claims priority from Korean Patent Application No. 10-2016-0172933, filed on Dec. 16, 2016, and Korean Patent Application No. 10-2017-0153347, filed on Nov. 16, 2017, which are hereby incorporated by reference in their entirety for all purposes as if fully set forth herein.

BACKGROUND

Field of the Disclosure

The present disclosure relates to a display device, a display panel, a fingerprint-sensing method, and a circuit for sensing a fingerprint.

Description of the Background

With the advent of the information age, there is growing demand for display devices for displaying images in various forms, and accordingly, different types of display devices, such as a liquid crystal display (LCD) device, a plasma display panel (PDP), and an organic light-emitting display (OLED) device, have been used in recent years.

Among these display devices, there is a display device capable of providing a touch-based input mode that enables a user to easily, intuitively, and conveniently input information or commands, representing a departure from the conventional input mode using buttons, a keyboard, and a mouse.

In order for the display device to provide the touch-based input mode, it is necessary to recognize whether a user performs a touch and to accurately detect the coordinates (position) of the touch.

Nowadays, display devices utilize biometric information, for example, fingerprints, for user authentication for online banking, product purchases, application purchase and download, and the like.

Such display devices achieve user authentication by detecting a user's fingerprint and comparing the detected fingerprint with the previously stored fingerprint in order to perform various application functions.

As described above, in order to correctly perform various application functions, a display device should accurately detect fingerprint information.

The conventional display device has a separate fingerprint sensor outside a display panel and detects a fingerprint using the fingerprint sensor.

Since the display device needs to include the separate fingerprint sensor, the process of manufacturing the display device becomes complicated.

In addition, since the fingerprint sensor is provided outside the display panel, the external area of the display panel is necessarily enlarged, resulting in inevitable constraints in the external design of the display device.

SUMMARY

Accordingly, an aspect of the present disclosure is to provide a display device, a display panel, a fingerprint-sensing method, and a circuit for sensing a fingerprint, which can detect a fingerprint without including a separate fingerprint sensor outside a display panel.

Another aspect of the present disclosure is to provide a display device, a display panel, a fingerprint-sensing method, and a circuit for sensing a fingerprint, which detect a fingerprint in a portion of a display panel that is designated as a fingerprint-sensing area.

Still another aspect of the present disclosure is to provide a display device, a display panel, a fingerprint-sensing method, and a circuit for sensing a fingerprint, which can detect a fingerprint using a pixel structure as a fingerprint-sensing structure.

Yet another aspect of present disclosure is to provide a display device, a display panel, a fingerprint-sensing method, and a circuit for sensing a fingerprint, which can recognize a fingerprint within an application screen.

Still another aspect of present disclosure is to provide a display device, a display panel, a fingerprint-sensing method, and a circuit for sensing a fingerprint, which can detect a fingerprint not only on the basis of capacitance but also by an optical method.

An aspect of the present disclosure may provide a display device including: a display panel in which K (K being a natural number of 2 or greater) data lines are disposed, H (H being a natural number of 2 or greater) gate lines are disposed, a plurality of pixel areas defined by the K data lines and the H gate lines are arranged, and a pixel electrode is disposed in each pixel area; a gate-driving circuit configured to drive the H gate lines; a data-driving circuit configured to drive the K data lines; a driving voltage supply circuit configured to supply a driving voltage to Q (Q being a natural number of 1 or greater) data lines among the K data lines; and a fingerprint-sensing circuit configured to detect fingerprint information in a first area including a pixel area defined by N (N being a natural number of 1 or greater) gate lines among the H gate lines and the Q data lines by detecting a signal from the Q data lines.

Another aspect of the present disclosure may provide a display panel including K (K being a natural number of 2 or greater) data lines and H (H being a natural number of 2 or greater) gate lines.

In the display panel, a first area including a pixel area defined by N (N being a natural number of 1 or greater) gate lines among the H gate lines and Q (Q being a natural number of 1 or greater) data lines among the K data lines may be a fingerprint-sensing area for detecting fingerprint information.

In the display panel, during a charging period within a fingerprint-sensing mode period, a gate signal of a turn-on level voltage may be sequentially supplied to the N gate lines, and a driving voltage, which is different from an image data voltage, may be supplied to the Q data lines.

In the display panel, during a sensing period within the fingerprint-sensing mode period, a gate signal of a turn-on level voltage may be sequentially supplied to the N gate lines and the Q data lines may be electrically connected to a fingerprint-sensing circuit.

Still another aspect of the present disclosure may provide an operation method of a display device including a display panel in which K (K being a natural number of 2 or greater) data lines are disposed, H (H being a natural number of 2 or greater) gate lines are disposed, a plurality of pixel areas defined by the K data lines and the H gate lines are arranged, and a pixel electrode is disposed in each pixel area.

The operation method may include a fingerprint-sensing mode start operation of recognizing an occurrence of a start event with respect to a fingerprint-sensing mode for detecting fingerprint information in an area including a pixel area defined by N (N being a natural number of 1 or greater) gate lines among the H gate lines and Q (Q being a natural number of 1 or greater) data lines among the K data lines.

The operation method may provide a charging operation of sequentially supplying a gate signal of a turn-on level voltage to the N gate lines and of supplying a driving voltage, different from an image data voltage, to the Q data lines.

The operation method may include a sensing operation of sequentially supplying a gate signal of a turn-on level voltage to the N gate lines, of supplying no driving voltage to the Q data lines, and of detecting a signal from the Q data lines.

Yet another aspect of the present disclosure may provide a circuit for fingerprint sensing including: a first circuit configured to supply a driving voltage to Q (Q being a natural number of 1 or greater) data lines among K (K being a natural number of 2 or greater) data lines; and a second circuit configured to detect a signal of the Q data lines.

Still another aspect of the present disclosure may provide a display device including: a display panel in which a data line is disposed, a gate line is disposed, a pixel area defined by the data line and the gate line is arranged, and a pixel electrode is disposed in the pixel area; and a fingerprint-sensing circuit configured to receive a signal from the data line electrically connected to the pixel electrode through a switching transistor and to detect fingerprint information after a driving voltage is applied to the pixel electrode.

According to the present disclosure, there may be provided a display device, a display panel, a fingerprint-sensing method, and a circuit for sensing a fingerprint, which can detect a fingerprint without including a separate fingerprint sensor outside a display panel.

According to the present disclosure, there may be provided a display device, a display panel, a fingerprint-sensing method, and a circuit for sensing a fingerprint, which detect a fingerprint in a portion of a display panel that is designated as a fingerprint-sensing area.

According to the present disclosure, there may be provided a display device, a display panel, a fingerprint-sensing method, and a circuit for sensing a fingerprint, which can detect a fingerprint using a pixel structure as a fingerprint-sensing structure.

According to the present disclosure, there may be provided a display device, a display panel, a fingerprint-sensing method, and a circuit for sensing a fingerprint, which can recognize a fingerprint within an application screen.

According to the present disclosure, there may be provided a display device, a display panel, a fingerprint-sensing method, and a circuit for sensing a fingerprint, which can detect a fingerprint not only on the basis of capacitance but also by an optical method.

BRIEF DESCRIPTION OF THE DRAWINGS

The above features and advantages of the present disclosure will be more apparent from the following detailed description taken in conjunction with the accompanying drawings, in which:

FIG. 3A illustrates a fingerprint-sensing structure of a display device according to present disclosure;

FIG. 14 is an operation truth table of the timing control switch circuit for the first fingerprint-sensing operation of the display device according to the present disclosure;

FIG. 17 is an operation truth table of the timing control switch circuit for the second fingerprint-sensing operation of the display device according to the present disclosure;

DETAILED DESCRIPTION

Figure 1:
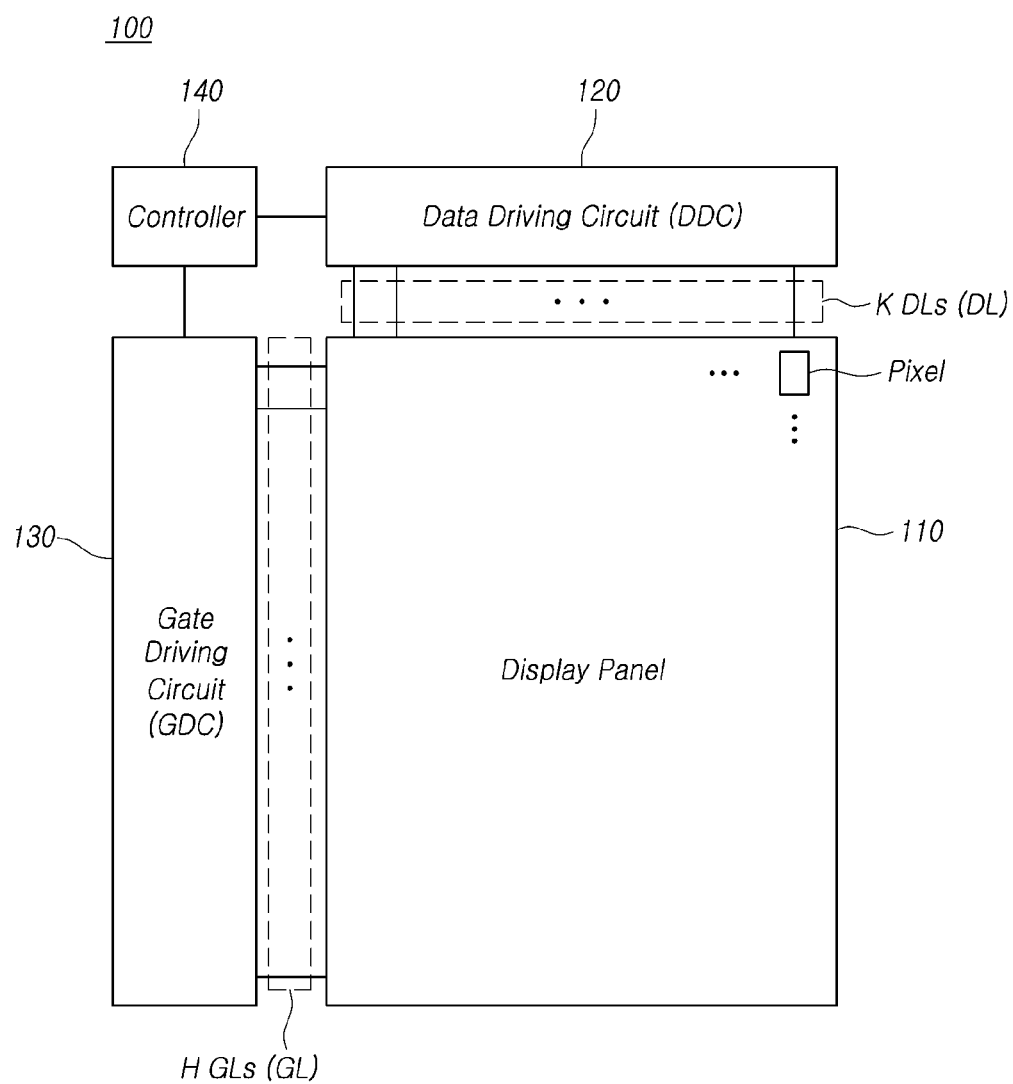
FIG. 1 illustrates a schematic configuration of a display device according to the present disclosure.

Hereinafter, embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
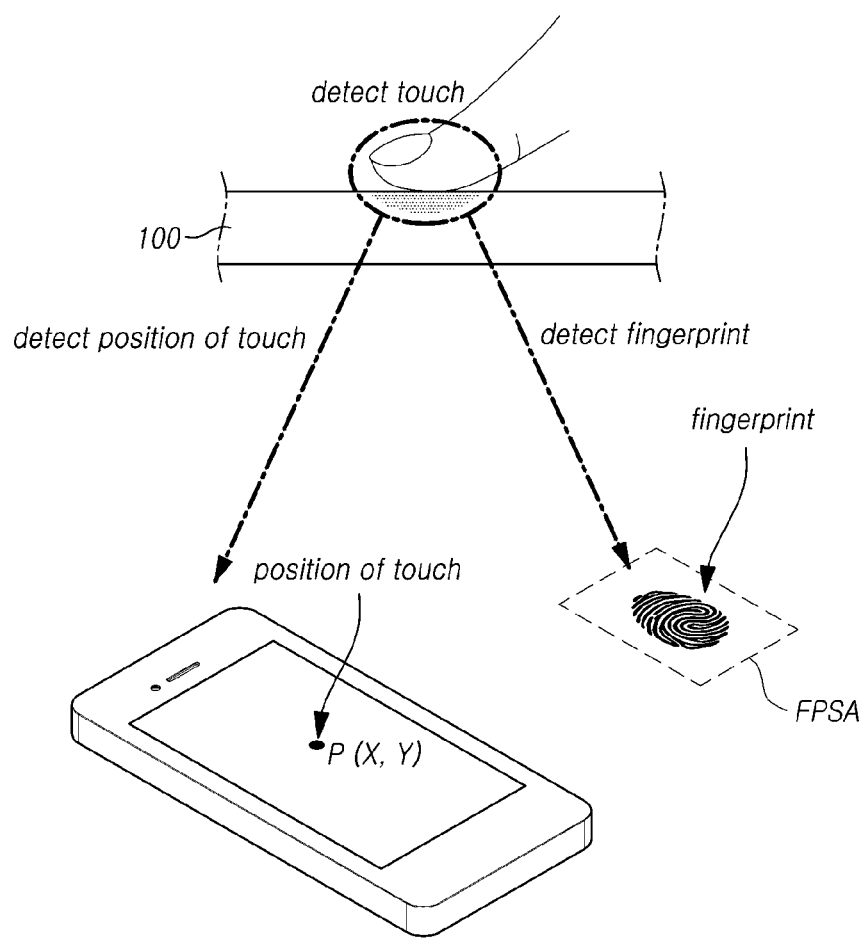
FIG. 2 illustrates two types of touch sensing by a display device according to the present disclosure.

FIG. 1 illustrates the schematic configuration of a display device 100 according to the present disclosure, and FIG. 2 illustrates two types of touch sensing by a display device according to the present disclosure.

Referring to FIG. 1, the display device 100 according to the present disclosure provides an image display function and a touch input function.

The display device 100 according to the present disclosure may include a display panel 110, a data-driving circuit 120, a gate-driving circuit 130, and a controller 140 to provide the image display function.

K data lines (DL) and H gate lines (GL) are disposed in the display panel 110. Here, K is a natural number of 2 or greater, and H is a natural number of 2 or greater.

A plurality of pixels defined by the K data lines (DL) and the H gate lines (GL) are arranged in the display panel 110.

A pixel electrode, to which an image data voltage corresponding to an image signal is applied in a corresponding pixel, and a switching transistor, for controlling the application of the image data voltage to the pixel electrode, may be disposed in each pixel area.

The data-driving circuit 120 is a circuit that drives the K data lines (DL) for image display and may output an image data voltage corresponding to an image signal to the K data lines (DL).

The gate-driving circuit 130 is a circuit that sequentially drives the H gate lines (GL) for image display and may sequentially supply a gate signal (scan signal) to the H gate lines (GL) for image display.

The controller 140 is a component that controls the data-driving circuit 120 and the gate-driving circuit 130 and supplies various control signals (e.g., data drive control signals and gate drive control signals) to the data-driving circuit 120 and the gate-driving circuit 130.

The controller 140 starts a scan in accordance with timing realized in each frame, converts input image data that is input from the outside according to a data signal format used by the data-driving circuit 120, outputs the converted image data, and controls data driving at a suitable time according to the scan.

The controller 140 may be a timing controller used in conventional display technology or a controller that performs further control functions, including those of a timing controller.

Although FIG. 1 shows that the data-driving circuit 120 is disposed at only one side (for example, the upper or lower side) of the display panel 110, data-driving circuits 120 may also be disposed on both sides (for example, upper and lower sides) of the display panel 110 depending on the driving method, the panel design, or the like.

The data-driving circuit 120 may be configured to include at least one source driver integrated circuit (SDIC).

Each SDIC may be connected to a bonding pad of the display panel 110 by a tape-automated-bonding (TAB) method or a chip-on-glass (COG) method or may be disposed directly on the display panel 110. If necessary, each SDIC may be integrated with the display panel 110. In addition, each SDIC may be mounted on a film connected to the display panel 110 by a chip-on-film (COF) method.

Each SDIC may include a shift register, a latch circuit, a digital-to-analog converter (DAC), an output buffer, and the like.

Each SDIC may further include an analog-to-digital converter (ADC) as necessary.

Although FIG. 1 shows that the gate-driving circuit 130 is disposed on only one side (for example, the left or right side) of the display panel 110, gate-driving circuits 130 may also be disposed on both sides (for example, left and right sides) of the display panel 110 depending on the driving method, the panel design, or the like.

The gate-driving circuit 130 may be configured to include at least one gate driver integrated circuit (GDIC).

Each GDIC may be connected to a bonding pad of the display panel 110 by a TAB method or a COG method, or may be provided in a gate-in-panel (GIP) type to be disposed directly on the display panel 110. As necessary, each GDIC may be integrated with the display panel 110. In addition, each GDIC may be mounted on a film connected to the display panel 110 by a COF method.

Each GDIC may include a shift register, a level shifter, and the like.

Each pixel disposed in the display panel 110 may include a circuit element such as a transistor.

The number and types of the circuit elements forming each pixel may be variously determined depending on the offered functionality, a design, and the like.

Meanwhile, the display device 100 according to the present disclosure may provide a touch-sensing function for sensing a touch by a user in order to provide a touch input function.

Here, a touch object, that is, a touch tool of the user, may be for example a finger, a pen, or the like. Hereinafter, for convenience of description, it is assumed that the touch object is a finger.

Referring to FIG. 2, in the present disclosure, the touch-sensing function includes a touch-position-sensing function for detecting the occurrence of a touch by the user and/or the position of a touch (that is, the coordinates of a touch P (X, Y)) and a fingerprint-sensing function (fingerprint recognition function) for detecting a fingerprint of the user.

In the display device 100 according to the present disclosure, a touch position sensor for detecting the position of a touch may be embedded in the display panel 110.

That is, in the display device 100 according to the present disclosure, a touch screen panel may be of a type that is embedded in the display panel 110 (for example, an in-cell type, an on-cell type, and the like).

The touch position sensor may be disposed over the entire area of the display panel 110.

The touch position sensor may be, for example, a common electrode (CE in FIG. 3A) that is disposed in the display panel 110 and is divided into a plurality of blocks.

In the display device 100 according to the present disclosure, a fingerprint sensor for detecting a fingerprint may also be embedded in the display panel 110.

The fingerprint sensor may be disposed in a fingerprint-sensing area (FPSA) corresponding to the entire area or some of the area of the display panel 110.

The fingerprint-sensing area (FPSA) may be an area where no image is displayed or an area where an image is displayed.

Referring to FIG. 1, in order to provide a touch-sensing function, the display device 100 according to present disclosure includes a touch-sensing circuit that drives the touch position sensor to obtain touch position information by detecting an electrical signal and a fingerprint-sensing circuit that drives the fingerprint sensor to obtain fingerprint information by detecting an electrical signal.

The touch-sensing circuit and the fingerprint-sensing circuit may be separate circuits.

Alternatively, the touch-sensing circuit and the fingerprint-sensing circuit may be the same circuit.

Alternatively, the fingerprint-sensing circuit may be part of the touch-sensing circuit.

Alternatively, the touch-sensing circuit may be part of the fingerprint-sensing circuit.

Touch position information may include at least one of information on whether the user touches a screen and information on the position of a touch (the coordinates of a touch P (X, Y)).

Fingerprint information may be information including the shape and pattern of ridges, which are protruding portions of a fingerprint, and valleys, which are grooves between ridges.

The fingerprint information may be biometric information unique to each user.

A user touch (including at least one of a touch for detecting the position of a touch and a touch for detecting a fingerprint) may mean that the user touches a screen (a touch screen, which is the surface corresponding to the fingerprint-sensing area) or may mean that the user does not touch the screen but approaches the screen within a certain distance.

As described above, the display device 100 may perform various application functions through touch-position sensing and may perform various application functions, such as user authentication, through fingerprint sensing.

Figure 3B:
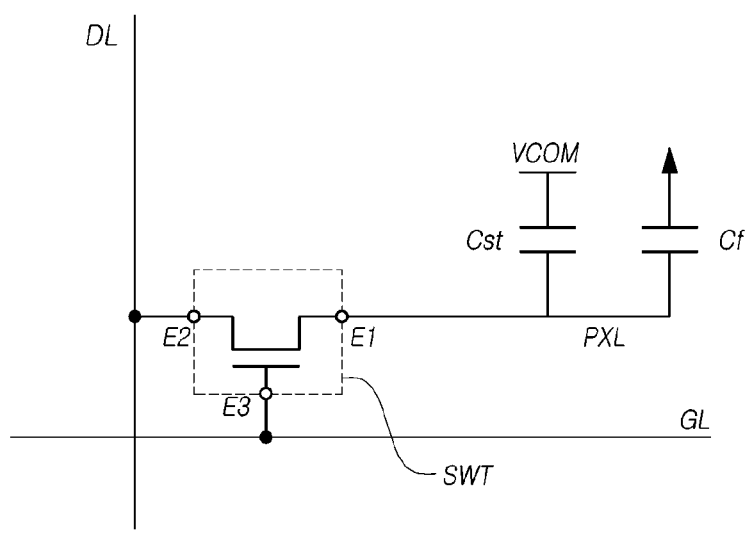
FIG. 3B is an equivalent circuit for the fingerprint-sensing structure of a display device according to the present disclosure.

FIG. 3A illustrates a fingerprint-sensing structure of a display device 100 according to the present disclosure, and FIG. 3B is an equivalent circuit for the fingerprint-sensing structure of a display device 100 according to the present disclosure.

Referring to FIGS. 3A and 3B, a display panel 110 according to the present disclosure has a fingerprint-sensing structure based on a pixel structure.

In the display panel 110 of the display device 100 according to the present disclosure, K data lines (DL) and H gate lines (GL) may be disposed, and a plurality of pixels defined by the K data lines (DL) and the H gate lines (GL) may be arranged.

In an area corresponding to each pixel, that is, each pixel area (PA), a pixel electrode (PXL), to which an image data voltage (that is, a pixel voltage), that is, an image signal corresponding to the pixel, is applied may be disposed.

Further, in each pixel area (PA), a switching transistor (SWT), which is turned on or off according to a gate signal applied to a gate node through a corresponding gate line (GL) and is electrically connected to a corresponding data line (DL) and a corresponding pixel electrode (PXL), may be disposed.

The switching transistor (SWT) transmits an image data voltage from the data line (DL) to the pixel electrode (PXL) in a turned-on state.

The switching transistor (SWT) includes a first node (E1) electrically connected to the pixel electrode (PXL), a second node (E2) electrically connected to the data line (DL), a third node (E3) electrically connected to the gate line (GL), and a semiconductor layer having both ends in contact with the first node (E1) and the second node (E2).

The switching transistor (SWT) may be turned on or off according to a gate signal (also referred to as a scan signal) applied to the third node (E3) from the gate line (GL).

In the switching transistor (SWT), the first node (E1) may be a drain node or a source node. The second node (E2) may be a source node or a drain node. The third node (E3) may be a gate node.

Hereinafter, for convenience of description, the first node (E1) may be referred to as a drain node, the second node (E2) as a source node, and the third node (E3) as a gate node.

The switching transistor (SWT) may be an n-type transistor or a p-type transistor.

As described above, in the present disclosure, the fingerprint-sensing structure may include a pixel electrode (PXL), a switching transistor (SWT), and an optical sensor (SEN), which are arranged in each pixel area (PA).

In the present disclosure, in the fingerprint-sensing structure, the pixel electrode (PXL) may be considered to correspond to a fingerprint sensor.

Further, in the present disclosure, the fingerprint-sensing structure may also be considered to include a data line (DL) and a gate line (GL).

A common electrode (CE), to which a common voltage (VCOM) is applied, may be disposed in the display panel 110.

The common electrode (CE) and each pixel electrode (PXL) may form a storage capacitor (Cst) that serves to maintain a voltage required for image display for an amount of time corresponding to one frame.

The capacitance of the storage capacitor (Cst) in each pixel may be determined based on a common voltage (VCOM) applied to the common electrode (CE) and a pixel voltage (corresponding to an image data voltage) applied to each pixel electrode (PXL).

When the user touches the display panel 110, a finger capacitance (Cf) may be formed between a finger and the pixel electrode (PXL).

The magnitude of the finger capacitance (Cf) may vary depending on the position of a corresponding pixel with respect to a touch.

Accordingly, the display device 100 may detect the occurrence of a touch and/or the position of a touch by finding the difference in magnitude of the finger capacitance (Cf).

The magnitude of the finger capacitance (Cf) may also vary depending on ridges, which are protruding portions of a fingerprint, and valleys, which are grooves between ridges.

Accordingly, the display apparatus 100 may detect fingerprint information including the pattern and shape of the ridges and valleys of the fingerprint by finding the difference in the magnitude of the finger capacitance (Cf).

Since the foregoing fingerprint-sensing structure is based on a pixel structure, the display panel 110 may not need to include a separate fingerprint sensor for fingerprint sensing.

Therefore, it is possible to simplify the fabrication of the display panel 110 having the fingerprint-sensing structure and to reduce the thickness of the display panel 110 having the fingerprint-sensing structure.

In addition, if an image can be displayed even in a fingerprint-sensing area (FPSA), it is not necessary to design to locate the fingerprint-sensing structure outside the display panel 110, making it easy to manufacture the display device 100.

According to the foregoing fingerprint-sensing structure, since both ends of the optical sensor (SEN) are in contact with the first node (E1) and the second node (E2) of the switching transistor (SWT), the switching transistor (SWT) and the optical sensor (SEN) may be considered to be a single combined element.

This feature is advantageous in that it is not necessary to separately manufacture a switching element for a display operation and a touch-sensor element for touch sensing.

Figure 4:
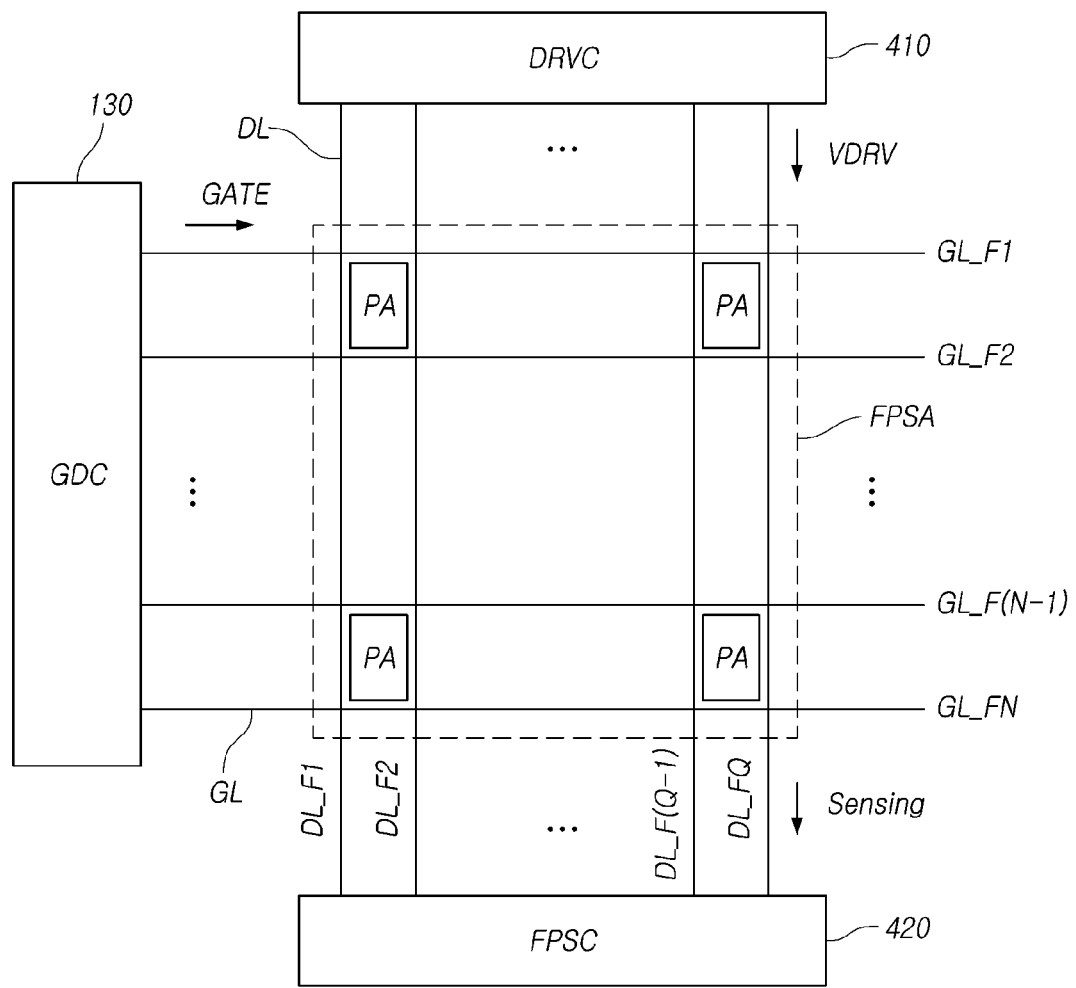
FIG. 4 illustrates a circuit diagram for fingerprint sensing of a display device according to the present disclosure.
Figure 5A:
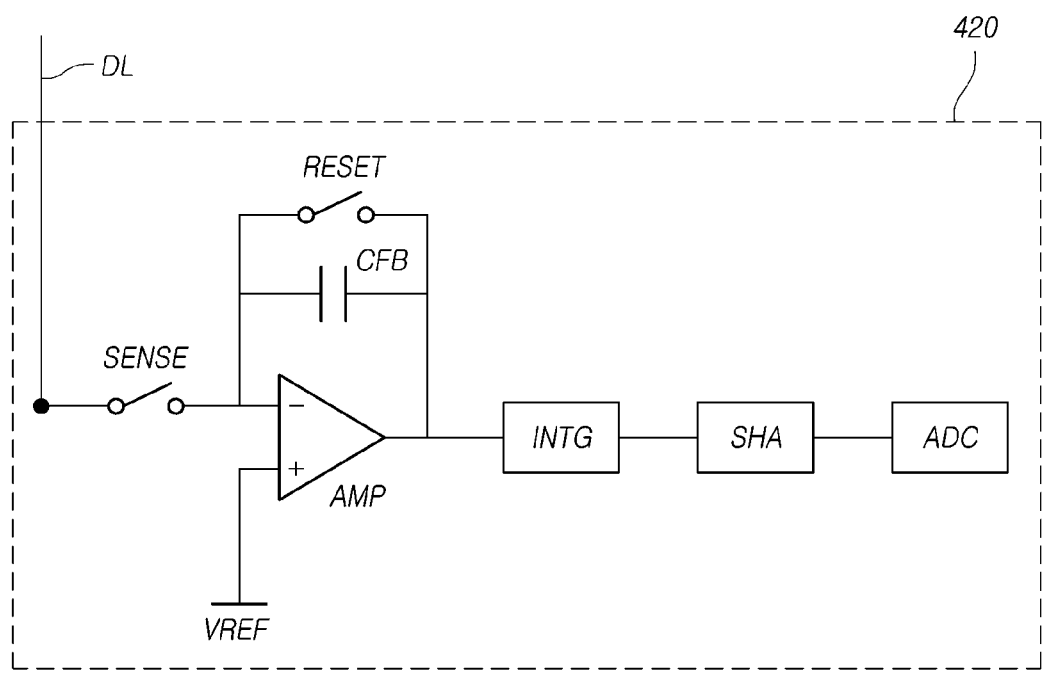
FIG. 5A illustrates a basic configuration of a fingerprint-sensing circuit of a display device according to embodiments of the present disclosure.
Figure 5B:
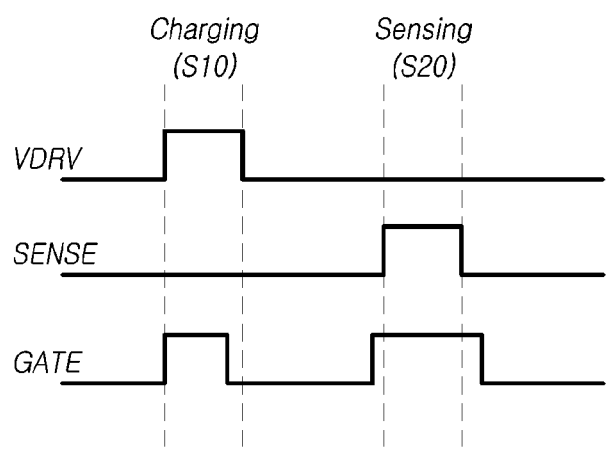
FIG. 5B is a timing diagram illustrating a basic method for a fingerprint-sensing operation of a display device according to the present disclosure.

FIG. 4 illustrates circuits for fingerprint sensing of a display device 100 according to present disclosure, FIG. 5A illustrates the basic configuration of a fingerprint-sensing circuit of a display device 100 according to present disclosure, and FIG. 5B is a timing diagram illustrating a basic method for a fingerprint-sensing operation of a display device 100 according to the present disclosure.

Referring to FIG. 4, a fingerprint-sensing area (FPSA) may be disposed in the entire area of a screen on which an image may be displayed in a display panel 110.

The fingerprint-sensing area (FPSA) is an area for detecting fingerprint information and may include at least one pixel area (PA) defined by N gate lines GL_F1 to GL_FN and Q data lines DL_F1 to DL_FQ, where N is a natural number of 1 or greater, and Q is a natural number of 1 or greater. The N gate lines GL_F1 to GL_FN are not only gate lines used for a display operation but also gate lines used for a fingerprint-sensing operation. The Q data lines DL_F1 to DL_FQ are not only data lines used for a display operation but also data lines used for a fingerprint-sensing operation.

Referring to FIG. 4, the display device 100 according to the present disclosure may include a driving voltage supply circuit (DRVC) 410, a fingerprint-sensing circuit (FPSC) 420, and a gate-driving circuit 130.

The driving voltage supply circuit 410 may be electrically connected to a data line (DL) corresponding to at least one pixel area (PA) disposed in a fingerprint-sensing area (FPSA).

Here, a switch circuit, which controls the connection of the driving voltage supply circuit 410 to at least one data line (DL), may be provided between the driving voltage supply circuit 410 and the at least one data line (DL).

The driving voltage supply circuit 410 supplies a driving voltage (VDRV) to the at least one electrically connected data line (DL) in order to apply the driving voltage (VDRV) to a pixel electrode (PXL) in the at least one pixel area (PA) disposed in the fingerprint-sensing area (FPSA).

When a gate signal (GATE) of a turn-on level voltage supplied to a gate line (GL) by the gate-driving circuit 130 is applied to a gate node of the switching transistor (SWT), the switching transistor (SWT) is turned on, whereby the data line (DL) and the pixel electrode (PXL) are electrically connected.

Accordingly, the driving voltage (VDRV) supplied to the data line (DL) by the driving voltage supply circuit 410 is applied to the pixel electrode (PXL) through the turned-on switching transistor (SWT).

The fingerprint-sensing circuit 420 may be electrically connected to the data line (DL) corresponding to the at least one pixel area (PA) disposed in the fingerprint-sensing area (FPSA).

A switch circuit, which controls the connection of the fingerprint-sensing circuit 420 to at least one data line (DL), may be provided between the fingerprint-sensing circuit 420 and the at least one data line (DL).

When the fingerprint-sensing circuit 420 is electrically connected to the data line (DL), the fingerprint-sensing circuit 420 may detect (sense) a signal on the data line (DL).

Here, the signal detected by the fingerprint-sensing circuit 420 may be a signal corresponding to an electric charge of a finger capacitance (Cf) or the magnitude of the finger capacitance (Cf).

Here, the finger capacitance (Cf) may be the capacitance formed between the pixel electrode (PXL) and the finger, the capacitance formed between the pixel electrode (PXL) and the ridges of the fingerprint, or the capacitance formed between the pixel electrode (PXL) and the valleys of the fingerprint.

The strength of the signal detected by the fingerprint-sensing circuit 420 may vary depending on how close the pixel electrode (PXL) is to the finger, that is, on the occurrence of a touch.

The strength of the signal detected by the fingerprint-sensing circuit 420 may vary depending on how close the pixel electrode (PXL) is to the fingerprint (ridges or valleys), that is, may differ for the ridges and valleys of the fingerprint.

The fingerprint-sensing circuit 420 may include: an amplifier (AMP) connected to the Q data lines DL_F1 to DL_FQ; an integrator (INTG) that receives and integrates an output signal from the amplifier (AMP) and outputs an integral value; a sample-and-hold circuit (SHA) that stores the integral value; and an analog-to-digital converter (ADC) that converts the value stored in the sample-and-hold circuit (SHA) into a digital value and outputs the digital value.

In the amplifier (AMP), a non-inverting input terminal (+) may receive a reference voltage (VREF) and may supply the reference voltage (VREF) to a corresponding data line (DL). In the amplifier (AMP), a signal from the corresponding data line (DL) is input to an inverting input terminal (−). In the amplifier (AMP), a capacitor (CFB) and a reset switch (RESET) may be connected in parallel between the inverting input terminal (−) and an output terminal.

The fingerprint-sensing circuit 420 may further include a switch circuit (SENSE) that controls the connection of the Q data lines DL_F1 to DL_FQ to the amplifier (AMP) in order to supply a reference voltage supply to the Q data lines DL_F1 to DL_FQ and to sense (detect a signal from) the Q data lines DL_F1 to DL_FQ. If necessary, the fingerprint-sensing circuit 420 may further include a switch circuit between the sample-and-hold circuit (SHA) and the analog-to-digital converter (ADC).

Referring to FIG. 5B, the basic method for the fingerprint-sensing operation may be conducted during a fingerprint-sensing mode period including a charging period S10 and a sensing period S20.

The charging period S10 is a period in which electric charges accumulate as finger capacitance (Cf) between the pixel electrode (PXL) and the finger (the valleys or ridges of the fingerprint) as a driving voltage (VDRV) is applied to the pixel electrode (PXL) disposed in the pixel area (PA) included in the fingerprint-sensing area (FPSA).

The charging period S10 is described in more detail as follows.

The gate-driving circuit 130 supplies a gate signal (GATE) of a turn-on level voltage to a gate line (GL). Here, the gate line (GL) is a gate line corresponding to the pixel area (PA) included in the fingerprint-sensing area (FPSA).

Accordingly, the switching transistor (SWT) disposed in the pixel area (PA) included in the fingerprint-sensing area (FPSA) is turned on.

The driving voltage supply circuit 410 supplies a driving voltage (VDRV) to a data line (DL). Here, the data line (DL) is a data line corresponding to the pixel area (PA) included in the fingerprint-sensing area (FPSA).

Accordingly, the pixel electrode (PXL) disposed in the pixel area (PA) included in the fingerprint-sensing area (FPSA) receives the driving voltage (VDRV) from the data line (DL) through the turned-on switching transistor (SWT).

A finger capacitance (Cf) is formed between the pixel electrode (PXL), which has received the driving voltage VDRV, and the finger (the valleys or ridges of the fingerprint), and electric charges accumulate as the finger capacitance (Cf).

After the charging period S10 expires and a predetermined period of time elapses, the sensing period S20 is performed.

The sensing period S20 is a period in which the fingerprint-sensing circuit 420 reads a signal that can represent electric charges accumulated as the finger capacitance (CO or the magnitude of finger capacitance (CO between the pixel electrode (PXL) and the finger (the valleys or ridges of the fingerprint).

In the sensing period S20, the gate-driving circuit 130 supplies a gate signal (GATE) of a turn-on level voltage to a gate line (GL). Here, the gate line (GL) is a gate line corresponding to the pixel area (PA) included in the fingerprint-sensing area (FPSA).

Accordingly, the switching transistor (SWT) disposed in the pixel area (PA) included in the fingerprint-sensing area (FPSA) is turned on, and the pixel electrode (PXL) is electrically connected to the data line (DL).

In the sensing period S20, a switch circuit (which may be TCSW shown in FIG. 13, 16, or 24) disposed between the fingerprint-sensing circuit 420 and the data line (DL) may perform a switching operation of electrically connecting the fingerprint-sensing circuit 420 and the data line (DL) according to a control signal (SENSE) indicating a sensing timing.

Accordingly, the fingerprint-sensing circuit 420 is electrically connected to the data line (DL) and detects a signal (signal necessary for fingerprint sensing) through the data line (DL).

The detected signal may be a signal representing electric charges accumulated as finger capacitance (CO or the magnitude of finger capacitance (CO between the pixel electrode (PXL) and the finger (the valleys or ridges of the fingerprint).

Figure 6:
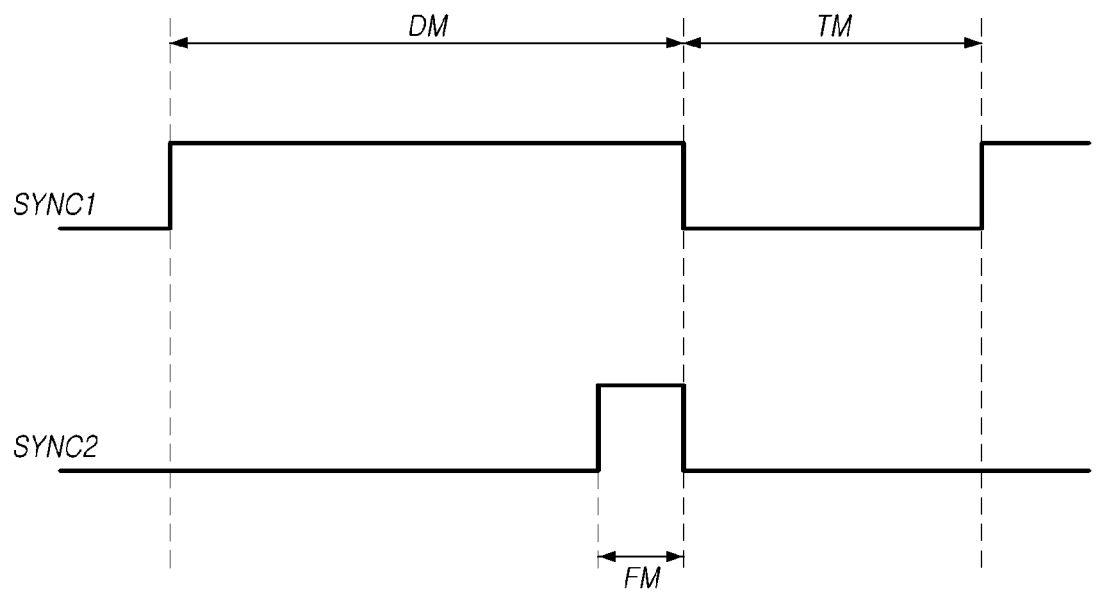
FIGS. 6 to 8 are timing diagrams illustrating operation modes of a display device according to the present disclosure.
Figure 7:
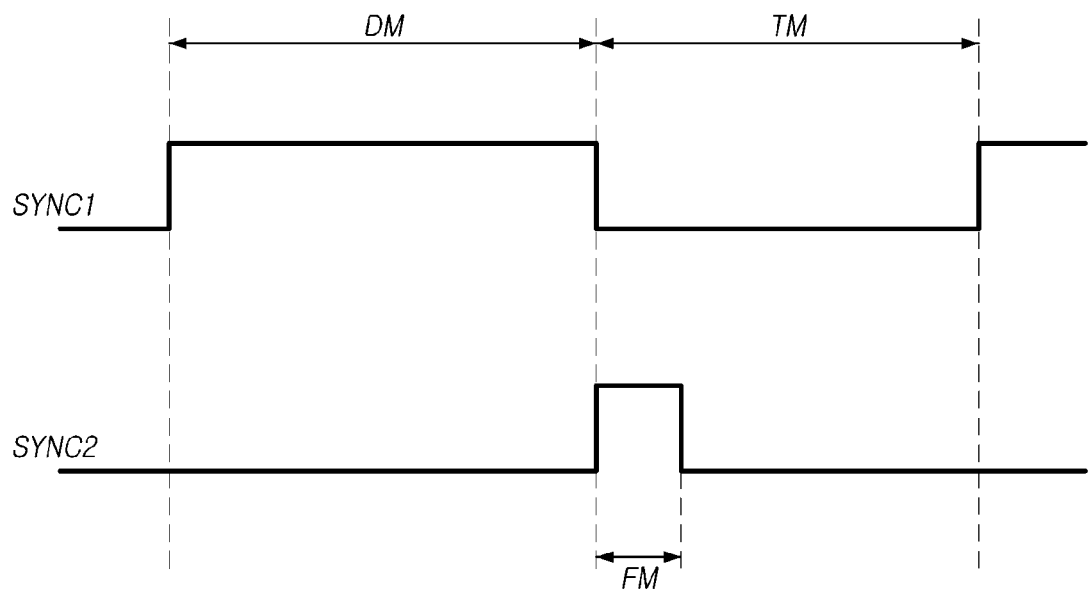
Figure 8:
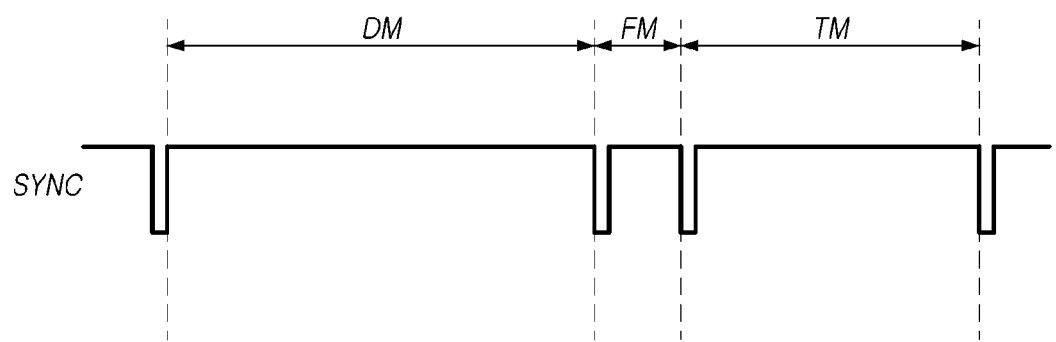

FIGS. 6 to 8 are timing diagrams illustrating operation modes of a display device 100 according to the present disclosure.

Referring to FIGS. 6 to 8, the display device 100 according to the present disclosure may basically operate in a display mode (DM) for image display and in a touch-sensing mode (TM) for detecting the occurrence of a touch and/or the position of a touch.

That is, operation modes of the display device 100 according to the present disclosure may basically include the display mode (DM) and the touch-sensing mode (TM).

A display-mode period, in which the display device 100 operates in the display mode (DM), and a touch-sensing mode period, in which the display device 100 operates in the touch-sensing mode (TM), may overlap or may be separated in time.

That is, the display device 100 may operate simultaneously in the display mode (DM) and the touch-sensing mode (TM). Alternatively, the operation period of the display device 100 may be temporally divided into a display-mode period and a touch-sensing mode period, and the display device 100 may operate in the display mode (DM) during the display-mode period and may operate in the touch-sensing mode (TM) during the touch-sensing mode period.

The display device 100 according to the present disclosure may also operate in a fingerprint-sensing mode (FM) for fingerprint sensing.

A fingerprint-sensing mode period in which the display device 100 operates in the fingerprint-sensing mode (FM) may be allocated according to various schemes.

According to a first allocation scheme, the display device 100 may operate in the fingerprint-sensing mode (FM) within the display-mode period.

That is, the fingerprint-sensing mode period may overlap the display-mode period for image display.

For example, as illustrated in FIG. 6, the fingerprint-sensing mode period may be included in the display-mode period and may occupy an end section of the display-mode period.

In another example, the fingerprint-sensing mode period is included in the display-mode period and may occupy a start section or a middle section of the display-mode period.

According to a second allocation scheme, the display device 100 may operate in the fingerprint-sensing mode (FM) within the touch-sensing mode period.

That is, the fingerprint-sensing mode period may overlap the touch-sensing mode period for detecting the occurrence of a touch or the position of a touch.

For example, as illustrated in FIG. 7, the fingerprint-sensing mode period may be included in the touch-sensing mode period and may occupy a start section of the touch-sensing mode period.

In another example, the fingerprint-sensing mode period may be included in the touch-sensing mode period, but may be in an end section or a middle section of the touch-sensing mode period.

According to a third allocation scheme, the display device 100 may operate in the fingerprint-sensing mode (FM) between the display-mode period and the touch-sensing mode period.

As illustrated in FIGS. 6 and 7, the display-mode period and the touch-sensing mode period may be defined by a first synchronization signal (SYNC1).

In this case, the fingerprint-sensing mode period may be defined by a second synchronization signal (SYNC2).

Alternatively, the fingerprint-sensing mode period may be defined without using the second synchronization signal (SYNC2).

For example, referring to FIG. 6, when a predetermined time has elapsed since the display-mode period started or when a display operation is completed at a predetermined position, the fingerprint-sensing mode period may be performed for a predetermined time.

In another example, referring to FIG. 7, when the touch-sensing mode period starts after the display-mode period expires, the fingerprint-sensing mode period starts immediately. When the fingerprint-sensing mode period expires, the touch-sensing mode period subsequently starts.

The display-mode period, the fingerprint-sensing mode period, and the touch-sensing mode period may be defined by one synchronization signal (SYNC) in a predetermined order.

For example, as illustrated in FIG. 8, when the signal level of a synchronization signal (SYNC) is changed from a low level (or high level) to a high level (or low level), the display-mode period may be performed.

When the display-mode period expires, the signal level of the synchronization signal (SYNC) is changed from the high level (or low level) to the low level (or high level). When the signal level of the synchronization signal (SYNC) is changed to the high level (or the low level) again, the fingerprint-sensing mode period may be performed.

When the fingerprint-sensing mode period expires, the signal level of the synchronization signal (SYNC) is changed from the high level (or low level) to the low level (or high level). When the signal level of the synchronization signal (SYNC) is changed to the high level (or low level) again, the touch-sensing mode period may be performed.

As described above, the display device 100 may operate in the fingerprint-sensing mode by allocating the fingerprint-sensing mode period at various timings depending on the system environment.

Figure 9:
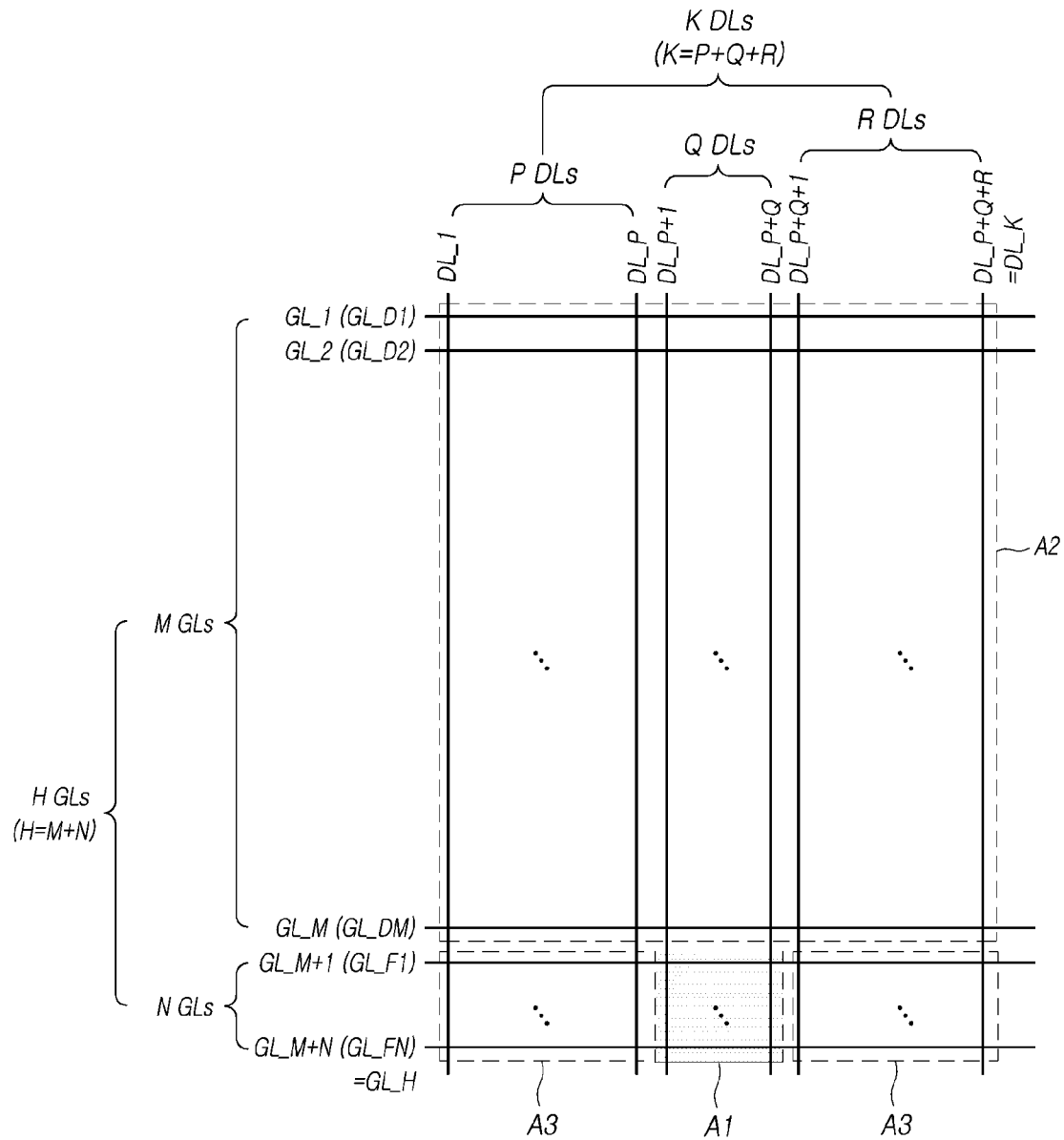
FIG. 9 illustrates areas defined in a display panel according to the present disclosure.

FIG. 9 illustrates areas A1, A2, and A3 in a display panel 110 according to the present disclosure.

Referring to FIG. 9, in the display panel 110 according to the present disclosure, K data lines DL_1 to DL_K and H gate lines GL_1 to GL_H are disposed. Here, K is a natural number of 2 or greater, and H is a natural number of 2 or greater.

A plurality of pixels defined by the K data lines DL_1 to DL_K and the H gate lines GL_1 to GL_H may be arranged in the display panel 110.

In the display panel 110, a pixel electrode (PXL) may be disposed in each of a plurality of pixel areas (PA).

Referring to FIG. 9, the H gate lines GL_1 to GL_H include N gate lines GL_M+1 through GL_M+N. Here, M is a natural number of 1 or greater, and N is a natural number of 1 or greater.

The N gate lines GL_M+1 to GL_M+N are gate lines used for a fingerprint-sensing operation for fingerprint sensing, and may also be referred to as GL_F1 to GL_FN.

Referring to FIG. 9, the K data lines DL_1 to DL_K include Q data lines DL_P+1 to DL_P+Q. Here, P is 0 or a natural number of 1 or greater, and Q is a natural number of 1 or greater.

The Q data lines DL_P+1 to DL_P+Q are data lines used not only for a display operation but also for a fingerprint-sensing operation.

Referring to FIG. 9, a first area A1 including a pixel area (PA) defined by the N gate lines GL_F1 to GL_FN among the H gate lines GL_1 to GL_H and the Q data lines DL_P+1 to DL_P+Q among the K data lines DL_1 to DL_K is a fingerprint-sensing area (FPSA) for detecting fingerprint information.

Hereinafter, an example of allocating the fingerprint-sensing area (FPSA) will be described in more detail with reference to FIG. 9.

Referring to FIG. 9, the H gate lines GL_1 to GL_H may include: M gate lines GL_1 to GL_M including a first gate line GL_1 to an Mth gate line GL_M; and the N gate lines GL_M+1 to GL_M+N including an (M+1)th gate line GL_M+1 to an (M+N)th gate line GL_M+N.

The M gate lines GL_1 to GL_M are gate lines used only for a display operation, and may also be referred to as GL_D1 to GL_DM.

The N gate lines GL_M+1 to GL_M+N may be disposed following the M gate lines GL_1 to GL_M.

The N gate lines GL_M+1 to GL_M+N are gate lines used for a fingerprint-sensing operation, and may also be referred to as GL_F1 to GL_FN.

M is the total number of gate lines used exclusively for a display operation, and may be a natural number of 1 or greater. N is the total number of gate lines used for a fingerprint-sensing operation, and may be a natural number of 1 or greater. M+N is H (the total number of gate lines disposed in the display panel 110).

Although FIG. 9 shows that the N gate lines GL_F1 to GL_FN are disposed after the M gate lines GL_D1 to GL_DM, the N gate lines GL_F1 to GL_FN may be disposed before the M gate lines GL_D1 to GL_DM.

As described above, the N gate lines GL_F1 to GL_FN among all the gate lines GL_1 to GL_H may be defined for a fingerprint-sensing operation.

Referring to FIG. 9, the K data lines DL_1 to DL_K may include: P data lines DL_1 to DL_P, including a first data line DL_1 to a Pth data line DL_P; the Q data lines DL_P+1 to DL_P+Q, including a (P+1)th data line DL_P+1 to a (P+Q)th data line DL_P+Q; and R data lines DL_P+Q+1 to DL_P+Q+R, including a (P+Q+1)th data line DL_P+Q+1 to a (P+Q+R)th data line DL_P+Q+R.

The P data lines DL_1 to DL_P and the R data lines DL_P+Q+1 to DL_P+Q+R are data lines used exclusively for a display operation.

The Q data lines DL_P+1 to DL_P+Q are data lines used both for a display operation and for a fingerprint-sensing operation.

P and R are each 0 or a natural number of 1 or greater, and P+R may be 1 or greater.

Q is the number of data lines used for a fingerprint-sensing operation, and may be a natural number of 1 or greater.

P+Q+R is K (the total number of data lines disposed in the display panel 110).

Although FIG. 9 shows that the data lines only for a display operation are disposed on both left and right sides of the Q data lines DL_P+1 to DL_P+Q used for a display operation and a fingerprint-sensing operation, the data lines only for a display operation may be disposed only on the left side or the right side.

When the data lines only for a display operation are disposed only on either of the left and right sides of the Q data lines DL_P+1 to DL_P+Q used for a display operation and a fingerprint-sensing operation, P or R may be a zero.

As described above, the Q data lines DL_P+1 to DL_P+Q among all the data lines DL_1 to DL_K may be defined for a fingerprint-sensing operation.

As described above, a fingerprint-sensing mode period, in which a display device 100 operates in a fingerprint-sensing mode (FM), may include a charging period S10 and a sensing period S20.

A driving state with respect to signal lines in the charging period S10 and the sensing period S20 within the fingerprint-sensing mode period will be described.

Referring to FIG. 9, during the charging period S10 within the fingerprint-sensing mode period in which the display device 100 operates in the fingerprint-sensing mode (FM), a gate signal (GATE) of a turn-on level voltage (for example, a high-level voltage or a low-level voltage) for turning on a switching transistor (SWT) may be sequentially supplied to the N gate lines GL_F1 to GL_FN for a fingerprint-sensing operation.

During the charging period S10, a driving voltage (VDRV), which is different from an image data voltage (DATA), may also be supplied to the Q data lines DL_P+1 to DL_P+Q.

During the sensing period S20 within the fingerprint-sensing mode period, in which the display device 100 operates in the fingerprint-sensing mode (FM), a gate signal (GATE) of a turn-on level voltage may be sequentially supplied to the N gate lines GL_F1 to GL_FN for a fingerprint-sensing operation.

Further, during the sensing period S20, the Q data lines DL_P+1 to DL_P+Q for a fingerprint-sensing operation may be electrically connected to a fingerprint-sensing circuit 420.

As described above, by allocating the N gate lines GL_F1 to GL_FN and the Q data lines DL_P+1 to DL_P+Q as signal lines for a fingerprint-sensing operation, it is possible to assign the first area A1, which is a portion of the display panel 110, as the fingerprint-sensing area (FPSA) and to detect fingerprint information in the first area A1 designated as the fingerprint-sensing area (FPSA).

Referring to FIG. 9, a second area A2 including a pixel area (PA) defined by the M gate lines GL_D1 to GL_DM, excluding the N gate lines GL_F1 to GL_FN among the H gate lines GL_1 to GL_H, and the K data lines DL_1 to DL_K may correspond to a display area (image display area).

In addition, a third area A3 including a pixel area (PA) defined by (K-Q) data lines DL_1 to DL_P and DL_P+Q+1 to DL_P+Q+R, excluding the Q data lines DL_P+1 to DL_P+Q, among the K data lines DL_1 to DL_K, and the N gate lines GL_F1 to GL_FN may correspond to a display area (image display area).

When both P and R are natural numbers of 1 or greater, as shown in FIG. 9, the third area A3 may be divided into two areas by the first area A1.

When one of P and R is 0, the third area A3 may not be divided by the first area A1.

The second area A2 and the third area A3, which may be a display area, are not used as fingerprint-sensing areas (FPSAs).

As described, the display panel 110 may include a display area for displaying an image without being used for fingerprint sensing.

The first area A1 may be not only a fingerprint-sensing area (FPSA) for detecting fingerprint information during a fingerprint-sensing mode period but also a display area for image display during a period (a display-mode period, or a period other than a fingerprint-sensing mode period within a display-mode period) other than the fingerprint-sensing mode period.

As described above, when the first area A1 is utilized as a display area as well as a fingerprint-sensing area (FPSA), a display area for displaying an image may be provided as wide as possible, and instantaneous fingerprint recognition within an application may be possible.

The display device 100 according to the present disclosure may include, as circuits for driving the display panel 110 and detecting a fingerprint, a gate-driving circuit 130 for driving the H gate lines GL_1 to GL_H, a data-driving circuit 120 for driving the K data lines DL_1 to DL_K, a driving voltage supply circuit 410 for supplying a driving voltage (VDRV) to the Q data lines DL_P+1 to DL_P+Q among the K data lines DL_1 to DL_K, and a fingerprint-sensing circuit 420 for detecting a signal required for fingerprint sensing from the Q data lines DL_P+1 to DL_P+Q among the K data lines DL_1 to DL_K.

The gate-driving circuit 130 may supply a gate signal (GATE) to the H gate lines GL_1 to GL_H or the M gate lines GL_D1 to GL_DM for a display operation.

The data-driving circuit 120 may supply an image data voltage (DATA) to the K data lines DL_1 to DL_K for display operation.

During a fingerprint-sensing mode period for detecting fingerprint information in the fingerprint-sensing area (FPSA), the Q data lines DL_P+1 to DL_P+Q and the N gate lines GL_F1 to GL_FN, which are for a fingerprint-sensing operation, are driven.

For a fingerprint-sensing operation, the gate-driving circuit 130 may sequentially supply a gate signal (GATE) to the N gate lines GL_F1 to GL_FN for a fingerprint-sensing operation among the H gate lines GL_1 to GL_H.

For a fingerprint-sensing operation, the driving voltage supply circuit 410 may supply a driving voltage (VDRV) to the Q data lines DL_P+1 to DL_P+Q for a fingerprint-sensing operation among the K data lines DL_1 to DL_K.

For fingerprint sensing, the fingerprint-sensing circuit 420 may detect a signal through the Q data lines DL_P+1 to DL_P+Q, thereby detecting fingerprint information in the fingerprint-sensing area (FPSA) corresponding to the first area A1 including the pixel area (PA) defined by the N gate lines GL_F1 to GL_FN among the H gate lines GL_1 to GL_H and the Q data lines DL_P+1 to DL_P+Q.

As described above, the display device 100 is capable of detecting fingerprint information by appropriately driving the N gate lines GL_F1 to GL_FN and the Q data lines DL_P+1 to DL_P+Q, which are for a fingerprint-sensing operation, and by detecting a signal through the Q data lines DL_P+1 to DL_P+Q with respect to the fingerprint-sensing area (FPSA) defined by the N gate lines GL_F1 to GL_FN and the Q data lines DL_P+1 to DL_P+Q.

Figure 10:
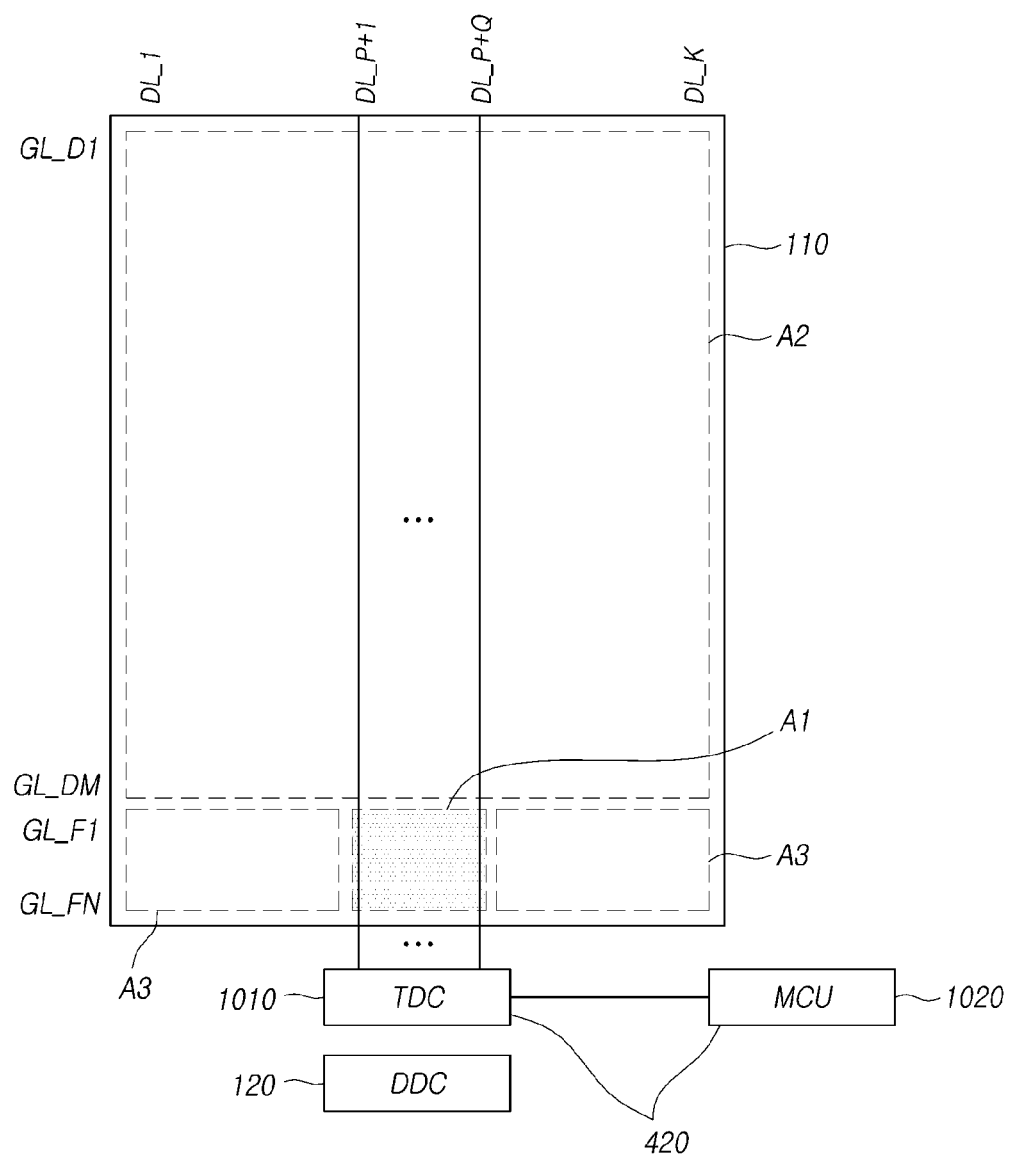
FIGS. 10 to 12 illustrate configurations of a data-driving circuit and a fingerprint-sensing circuit of a display device according to the present disclosure.
Figure 11:
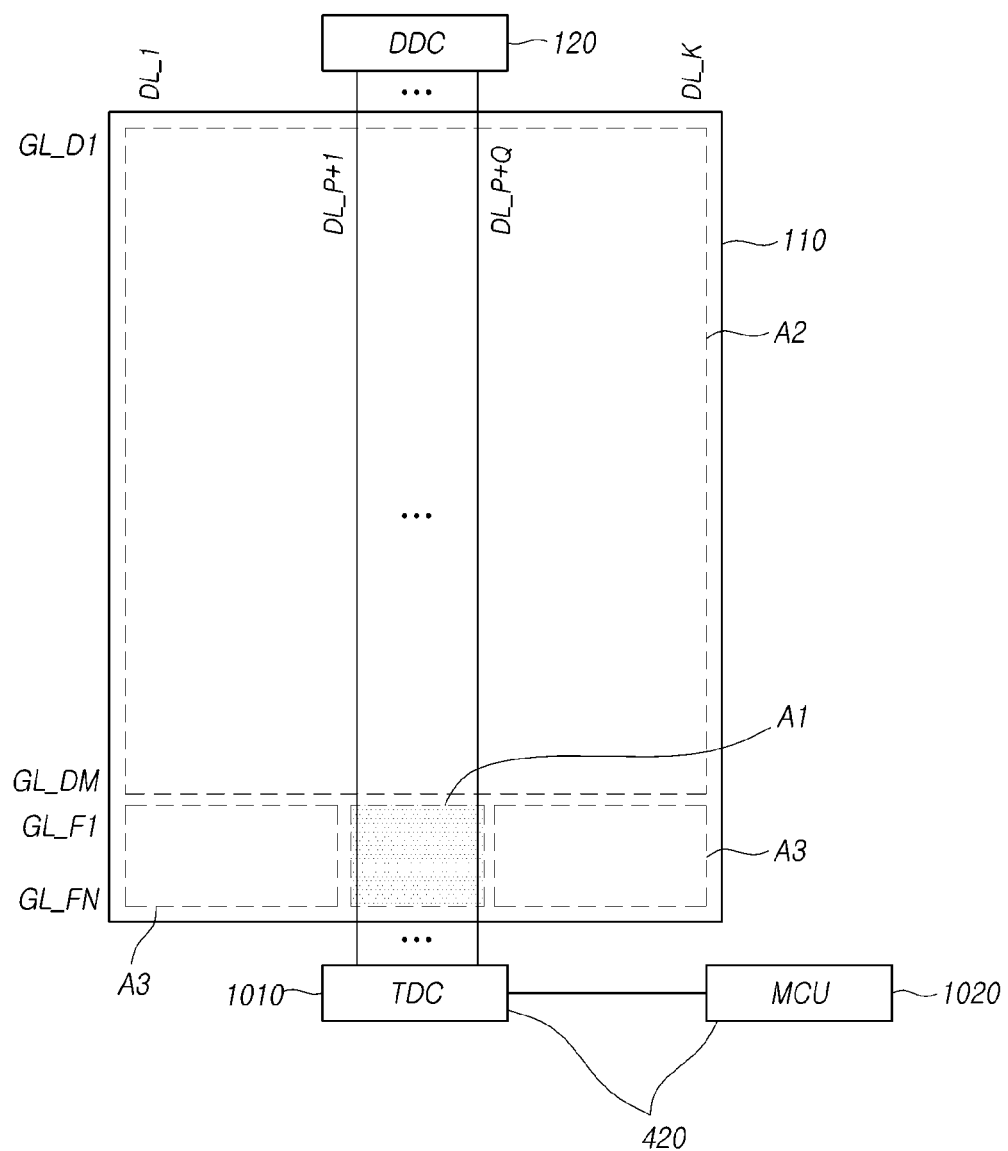
Figure 12:
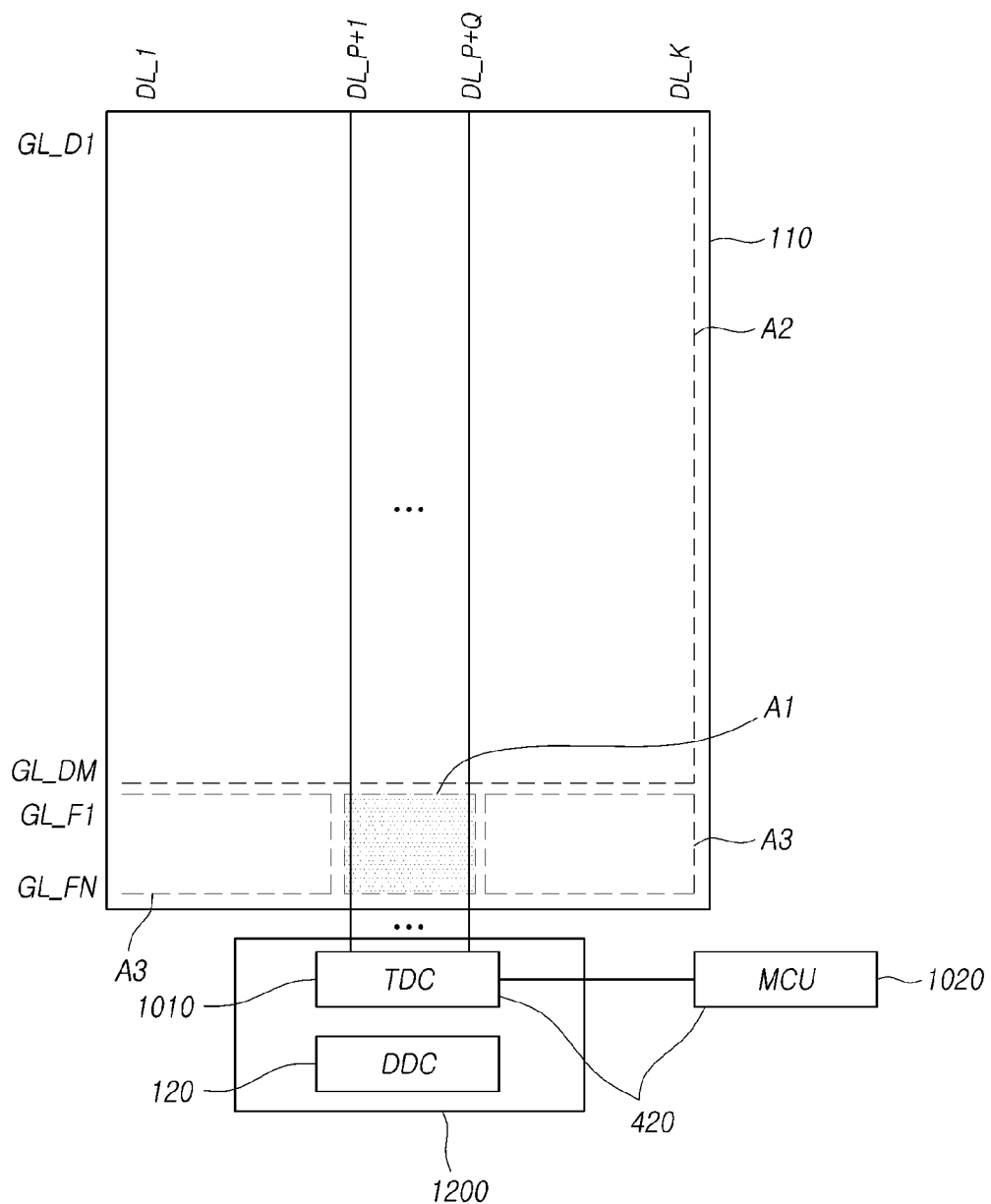

FIGS. 10 to 12 illustrate configurations of a data-driving circuit 120 and a fingerprint-sensing circuit 420 of a display device 100 according to the present disclosure.

Referring to FIGS. 10 to 12, the fingerprint-sensing circuit 420 may include a signal detection circuit (TDC) 1010 that detects a signal from Q data lines DL_P+1 to DL_P+Q for a fingerprint-sensing operation and a micro control unit (MCU) 1020 that detects fingerprint information using a detection result from the signal detection circuit 1010.

As illustrated in FIG. 5A, The signal detection circuit 1010 may include: an amplifier (AMP) connected to the Q data lines DL_P+1 to DL_P+Q; an integrator (INTG) that receives and integrates an output signal from the amplifier (AMP) and outputs an integral value; a sample-and-hold circuit (SHA) that stores the integral value; and an analog-to-digital converter (ADC) that converts the value stored in the sample-and-hold circuit (SHA) into a digital value and outputs the digital value.

The signal detection circuit 1010 may further include one or more multiplexers between the Q data lines DL_P+1 to DL_P+Q and the amplifier (AMP) and one or more multiplexers between the sample-and-hold circuit (SHA) and the analog-to-digital converter (ADC).

As described above, when the fingerprint-sensing circuit 420 is divided into the signal detection circuit 1010 and the micro control unit 1020, a signal detection function and a fingerprint-sensing function may be efficiently performed and the load on the circuit may be reduced.

As illustrated in FIGS. 10 and 11, the signal detection circuit 1010 may be constituted as an integrated circuit separate from the data-driving circuit (DDC) 120 that supplies an image data voltage (DATA) to K data lines DL_1 to DL_K for a display operation.

As illustrated in FIG. 10, both the data-driving circuit 120 and the signal detection circuit 1010 may be disposed at one side of the display panel 110.

As illustrated in FIG. 11, the signal detection circuit 1010 may be disposed at one side of the display panel 110, and the data-driving circuit 120 may be disposed at another side of the display panel 110.

As illustrated in FIG. 12, the data-driving circuit 120 and the signal detection circuit 1010 may be integrated as a combined integrated circuit 1200.

As the data-driving circuit 120 and the signal detection circuit 1010 are integrated as a single combined integrated circuit 1200, the number of circuit components may be reduced.

One of the data-driving circuit 120, the fingerprint-sensing circuit 420, and a driving voltage supply circuit 410 may be electrically connected to the data lines depending on the operation mode.

That is, all of the data-driving circuit 120, the fingerprint-sensing circuit 420, and the driving voltage supply circuit 410 are circuits that can be connected to the data lines.

The driving voltage supply circuit 410 is a circuit for supplying a driving voltage (VDRV) to the Q data lines DL_P+1 to DL_P+Q for a fingerprint-sensing operation to perform a fingerprint-sensing operation, which may be included in the data-driving circuit 120 connectable with the data lines or in the signal detection circuit 1010 of the fingerprint-sensing circuit 420.

Alternatively, the driving voltage supply circuit 410 may be included in a circuit (for example, the combined integrated circuit 1200) including the data-driving circuit 120, or may be included in a circuit (for example, the combined integrated circuit 1200) including the signal detection circuit 1010 of the fingerprint-sensing circuit 420.

As described above, the circuits related to the data lines (DL) may be integrated, thereby reducing the number of circuit components.

FIGS. 13 to 15B illustrate a method for a first fingerprint-sensing operation of a display device 100 according to the present disclosure.

Figure 13:
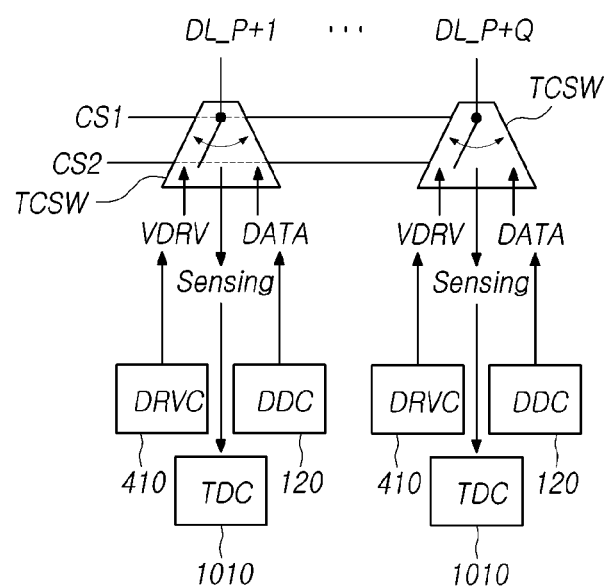
FIG. 13 is a timing control switch circuit for a first fingerprint-sensing operation of a display device according to the present disclosure.

FIG. 13 is a timing control switch circuit (TCSW) for the first fingerprint-sensing operation of the display device 100 according to the present disclosure; FIG. 14 is an operation truth table of the timing control switch circuit (TCSW) for the first fingerprint-sensing operation of the display device 100 according to the present disclosure; and FIGS. 15A and 15B are operation timing diagrams of the first fingerprint-sensing operation of the display device 100 according to the present disclosure.

Figure 15A:
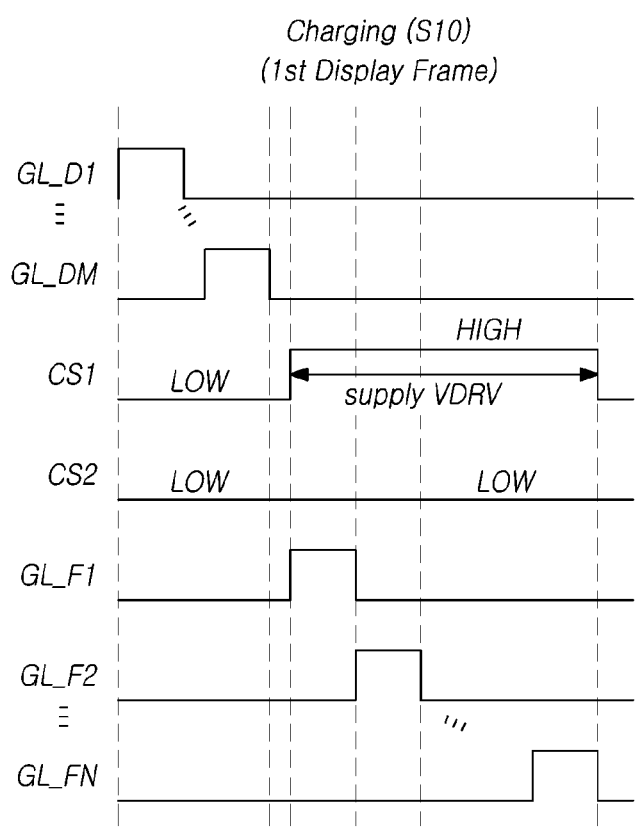
FIGS. 15A and 15B are operation timing diagrams of the first fingerprint-sensing operation of the display device according to the present disclosure.
Figure 15B:
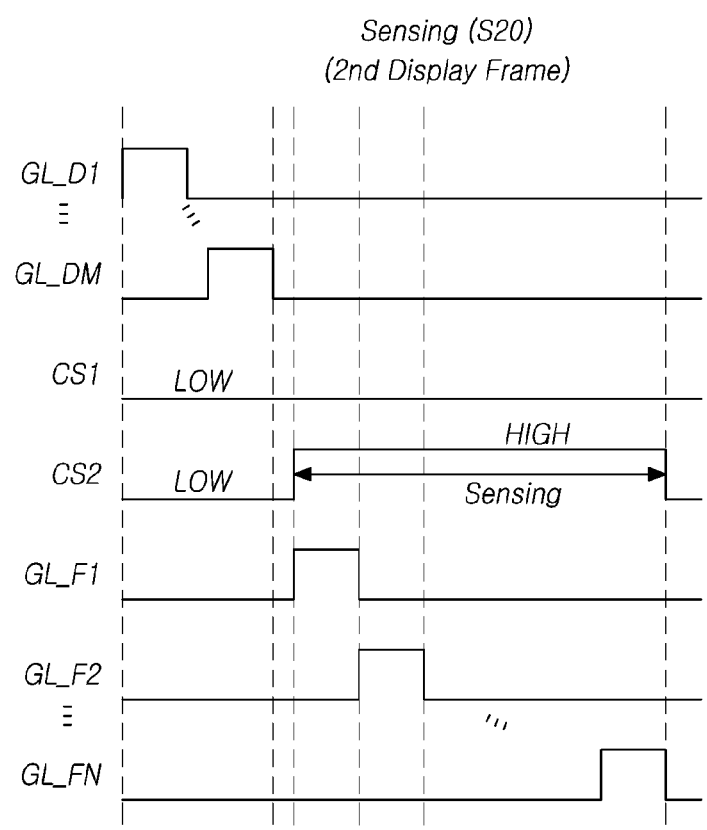

Referring to FIGS. 15A and 15B, a fingerprint-sensing mode period includes a charging period S10 and a sensing period S20.

The charging period S10 and the sensing period S20 may be performed in one frame period or in different frame periods.

FIGS. 15A and 15B show operation timing diagrams illustrating an example in which the charging period S10 is performed after a display operation within a first frame period and the sensing period S20 is performed after a display operation within a second frame period.

Thus, as shown in FIG. 15A, a period in which M gate lines GL_D1 to GL_DM are sequentially driven is a period in which a display operation is performed in the first frame period. As shown in FIG. 15B, a period in which the M gate lines GL_D1 to GL_DM are sequentially driven is a period in which a display operation is performed in the second frame period.

Referring to FIG. 15A, during the charging period S10, a gate-driving circuit 130 sequentially supplies a gate signal (GATE) of a turn-on level voltage to N gate lines GL_F1 to GL_FN.

Accordingly, Q switching transistors (SWT) disposed in a pixel row corresponding to a gate line supplied with the gate signal (GATE) of the turn-on level voltage among the N gate lines GL_F1 to GL_FN are turned on.

Therefore, Q data lines DL_P+1 to DL_P+Q and Q pixel electrodes (PXL) in the corresponding pixel row are electrically connected by the turned-on switching transistors (SWT).

During the charging period S10, a driving voltage supply circuit 410 supplies a driving voltage (VDRV) to the Q data lines DL_P+1 to DL_P+Q.

The driving voltage (VDRV), supplied from the driving voltage supply circuit 410 to the Q data lines DL_P+1 to DL_P+Q, is applied to the Q pixel electrodes (PXL) disposed in a pixel row corresponding to a sequentially turned-on gate line (one of GL_F1 to GL_FN).

A finger capacitance (Cf) is formed by the ridges or valleys of the fingerprint between each pixel electrode (PXL) and the finger.

When a predetermined period of time has elapsed after the charging period S10, the sensing period S20 may be performed.

Referring to FIG. 15B, during the sensing period S20, the gate-driving circuit 130 sequentially supplies a gate signal (GATE) of a turn-on level voltage to the N gate lines GL_F1 to GL_FN.

Accordingly, Q switching transistors (SWT), disposed in a pixel row corresponding to a gate line supplied with the gate signal (GATE) of the turn-on level voltage among the N gate lines GL_F1 to GL_FN, are turned on.

Therefore, Q data lines DL_P+1 to DL_P+Q and Q pixel electrodes (PXL) in the corresponding pixel row are electrically connected by the turned-on switching transistors (SWT).

During the sensing period S20, the driving voltage supply circuit 410 does not supply a driving voltage (VDRV) to the Q data lines DL_P+1 to DL_P+Q.

During the sensing period S20, a fingerprint-sensing circuit 420 is electrically connected to the Q data lines DL_P+1 to DL_P+Q to detect signals through the Q data lines DL_P+1 to DL_P+Q.

According to the aforementioned method for the first fingerprint-sensing operation, it is possible to detect a fingerprint in a fingerprint-sensing area (FPSA) of a display panel 110.

According to the aforementioned method for the first fingerprint-sensing operation, each of the Q data lines DL_P+1 to DL_P+Q used for a fingerprint-sensing operation is supplied with a driving voltage (VDRV) from the driving voltage supply circuit 410 and is electrically connected to a signal detection circuit 1010 of the fingerprint-sensing circuit 420 for sensing.

The Q data lines DL_P+1 to DL_P+Q are also used for a display operation. Accordingly, each of the Q data lines DL_P+1 to DL_P+Q may be supplied with an image data voltage (DATA) from a data-driving circuit 120.

Therefore, in the present disclosure, since the Q data lines DL_P+1 to DL_P+Q are used for various usages (to transfer an image data voltage (DATA), to transfer a driving voltage (VDRV), as a sensing path, and the like), a switch configuration is needed to switch among the various usages.

Thus, as illustrated in FIG. 13, the display device 100 according to the present disclosure may further include a timing control switch circuit (TCSW) for each of the Q data lines DL_P+1 to DL_P+Q.

Referring to FIG. 13, the timing control switch circuit (TCSW) for each of the Q data lines DL_P+1 to DL_P+Q may control the electrical connection (first connection) of a corresponding data line among the Q data lines DL_P+1 to DL_P+Q with the driving voltage supply circuit 410, the electrical connection (second connection) of the corresponding data line with the fingerprint-sensing circuit 420, and the electrical connection (third connection) of the corresponding data line with the data-driving circuit 120.

Each timing control switch circuit (TCSW) may be configured to include one or more switch elements.

For example, each timing control switch circuit (TCSW) may be configured with one switch element or with two or three switch elements.

Using the foregoing timing control switch circuit (TCSW) enables a display operation and a fingerprint-sensing operation (the supply of a driving voltage and the detection of a signal) with respect to the Q data lines DL_P+1 to DL_P+Q.

Referring to FIGS. 13, 14, and 15, the timing control switch circuit (TCSW) may operate according to a first control signal (CS1) and a second control signal (CS2).

The first control signal (CS1) and the second control signal (CS2) may be provided from a micro control unit 1020 or a controller 140.

In a first case, when the first control signal (CS1) and the second control signal (CS2) have a first level (for example, low level 0), each timing control switch circuit (TCSW) performs a switching operation for a display operation.

That is, when the first control signal (CS1) and the second control signal (CS2) have the first level (for example, low level 0), each timing control switch circuit (TCSW) may electrically connect the corresponding data line among the Q data lines DL_P+1 to DL_P+Q with the data-driving circuit 120, thereby supplying an image data voltage (DATA) to the corresponding data line.

In a second case, when the first control signal (CS1) has a second level (for example, a high level 1) and the second control signal (CS2) has the first level (for example, a low level 0), each timing control switch circuit (TCSW) may perform a switching operation in the charging period S10 within the fingerprint-sensing mode period.

That is, when the first control signal (CS1) has the second level (for example, a high level 1) and the second control signal (CS2) has the first level (for example, a low level 0), each timing control switch circuit (TCSW) may electrically connect the corresponding data line among the Q data lines DL_P+1 to DL_P+Q with the driving voltage supply circuit 410, thereby supplying a driving voltage (VDRV) to the corresponding data line.

In a third case, when the first control signal (CS1) has the first level (for example, low level 0) and the second control signal (CS2) has the second level (for example, high level 1), each timing control switch circuit (TCSW) may perform a switching operation in the sensing period S20 within the fingerprint-sensing mode period.

That is, when the first control signal (CS1) has the first level (for example, a low level 0) and the second control signal (CS2) has the second level (for example, a high level 1), each timing control switch circuit (TCSW) may electrically connect a corresponding data line among the Q data lines DL_P+1 to DL_P+Q with the fingerprint-sensing circuit 420, thereby controlling the signal detection circuit 1010 of the fingerprint-sensing circuit 420 to thus detect a signal of the corresponding data line.

According to the control of the switching operation by each timing control switch circuit (TCSW) described above, a display operation and a fingerprint-sensing operation (the supply of a driving voltage and the detection of a signal) with respect to the Q data lines DL_P+1 to DL_P+Q may be effectively controlled.

FIGS. 16 to 18B illustrate a method for a second fingerprint-sensing operation of a display device 100 according to the present disclosure.

Figure 16:
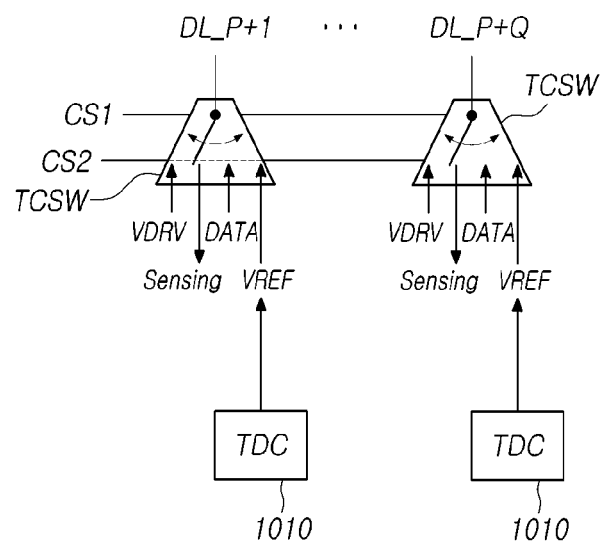
FIG. 16 is a timing control switch circuit for a second fingerprint-sensing operation of a display device according to the present disclosure.
Figure 18A:
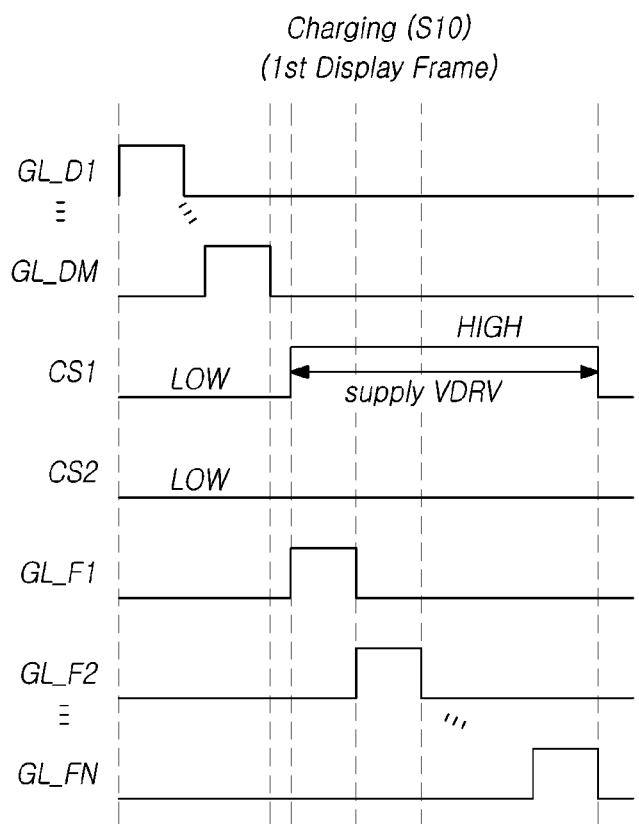
FIGS. 18A and 18B are operation timing diagrams of the second fingerprint-sensing operation of the display device according to the present disclosure.
Figure 18B:
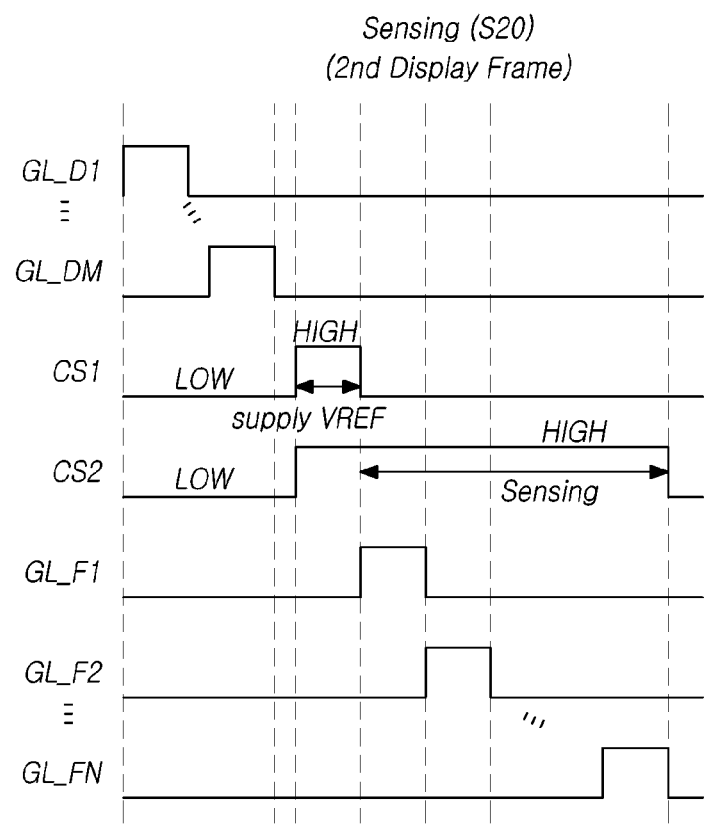

FIG. 16 is a timing control switch circuit (TCSW) for the second fingerprint-sensing operation of the display device 100 according to the present disclosure; FIG. 17 is an operation truth table of the timing control switch circuit (TCSW) for the second fingerprint-sensing operation of the display device 100 according to the present disclosure; and FIGS. 18A and 18B are operation timing diagrams of the second fingerprint-sensing operation of the display device 100 according to the present disclosure.

The method for the second fingerprint-sensing operation is basically the same as the method for the first fingerprint-sensing operation.

The method for the second fingerprint-sensing operation is different from the method for the first fingerprint-sensing operation in that a parasitic capacitance component that may occur in Q data lines DL_P+1 to DL_P+Q is removed or an operation for resetting (initializing) the voltage of the Q data lines DL_P+1 to DL_P+Q is added in the fingerprint-sensing operation.

In describing the method for the second fingerprint-sensing operation with reference to FIGS. 16 to 18B, only differences with the method for the first fingerprint-sensing operation will be described.

Referring to FIG. 18B, during a sensing period S20, a fingerprint-sensing circuit 420 supplies a reference voltage (VREF) to the Q data lines DL_P+1 to DL_P+Q before detecting a signal of the Q data lines DL_P+1 to DL_P+Q.

Therefore, in the sensing period S20, a parasitic capacitance component is removed from the Q data lines DL_P+1 to DL_P+Q, thereby increasing the accuracy of fingerprint information obtained based on the signal detected through the Q data lines DL_P+1 to DL_P+Q.

Also, since a signal of the Q data lines DL_P+1 to DL_P+Q is detected after resetting the voltage of the Q data lines DL_P+1 to DL_P+Q to the reference voltage (VREF) right before the detection of the signal from the Q data lines DL_P+1 to DL_P+Q, the accuracy of fingerprint information obtained based on the detected signal may be increased.

For an operation of supplying the reference voltage (VREF), referring to FIGS. 16 and 17, the Q data lines DL_P+1 to DL_P+Q are used not only to transfer an image data voltage (DATA), to transfer a driving voltage (VDRV), and as a sensing path, but also to transfer the reference voltage (VREF). Thus, each timing control switch circuit (TCSW) performs a switching operation to switch among various usages including the transfer of the reference voltage (VREF) of the Q data lines DL_P+1 to DL_P+Q.

When a first control signal (CS1) has a second level and a second control signal (CS2) has the second level with respect to the transfer of the reference voltage (VREF), each timing control switch circuit (TCSW) may perform a switching operation for supplying the reference voltage.

That is, when the first control signal (CS1) has the second level and the second control signal (CS2) has the second level, each timing control switch circuit (TCSW) may electrically connect a corresponding data line among the Q data lines DL_P+1 to DL_P+Q with a signal detection circuit 1010 of the fingerprint-sensing circuit 420, thereby controlling the fingerprint-sensing circuit 420 to supply the reference voltage (VREF) to the corresponding data line.

An amplifier included in the signal detection circuit 1010 outputs the reference voltage (VREF) input from a first terminal (ex. positive terminal) to a second terminal (ex. negative terminal), so that the reference voltage (VREF) may be supplied to the corresponding data line of the Q data lines DL_P+1 to DL_P+Q in a display panel 110.

According to the control of the switching operation by each timing control switch circuit (TCSW) described above, it is possible to effectively supply the reference voltage (VREF) to the Q data lines DL_P+1 to DL_P+Q.

The aforementioned fingerprint-sensing method is a capacitance-based fingerprint-sensing method, and optical fingerprint sensing is also possible.

In the following method, the aforementioned fingerprint-sensing structure, fingerprint-sensing operation timings and the like are employed, and an optical fingerprint-sensing function is added.

Therefore, descriptions of the fingerprint-sensing structure and the fingerprint-sensing operation timings, which are mentioned above, will be omitted, and only details related to the optical fingerprint-sensing function will be explained.

FIGS. 19 to 22B illustrate a method for a third fingerprint-sensing operation (an optical method for a fingerprint-sensing operation) of a display device 100 according to the present disclosure.

Figure 19:
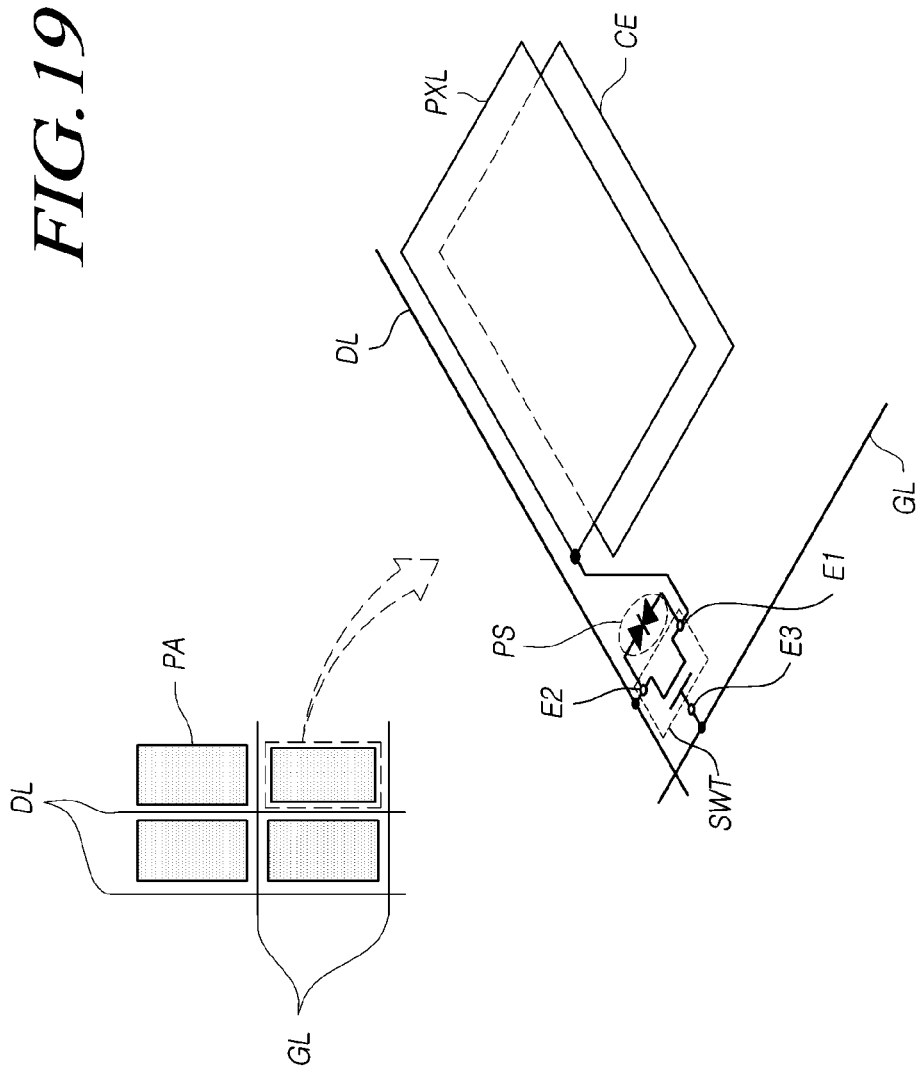
FIG. 19 illustrates an optical fingerprint-sensing structure of a display device according to the present disclosure.
Figure 20:
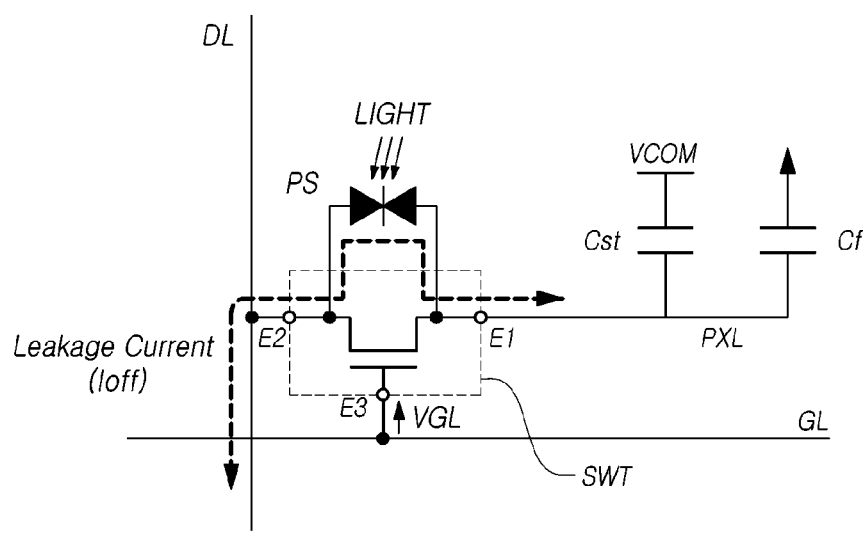
FIG. 20 is an equivalent circuit of the optical fingerprint-sensing structure of a display device according to the present disclosure.

FIG. 19 illustrates an optical fingerprint-sensing structure of the display device 100 according to the present disclosure; FIG. 20 is an equivalent circuit of the optical fingerprint-sensing structure of the display device 100 according to the present disclosure; and FIG. 21 illustrates a light irradiation device 2100 of the display device 100 according to the present disclosure.

Referring to FIGS. 19 and 20, as described above, in each pixel area (PA) included in a first area (A1) as a fingerprint-sensing area (FPSA), a switching transistor (SWT) may be disposed, which is controlled by a gate signal (GATE) applied to a gate node (E3) through a corresponding gate line among N gate lines GL_F1 to GL_FN for a fingerprint-sensing operation and is electrically connected to a corresponding data line among Q data lines DL_P+1 to DL_P+Q and to a corresponding pixel electrode (PXL).

Referring to FIGS. 19 and 20, in each pixel area (PA) included in the first area (A1) as the fingerprint-sensing area (FPSA), an optical sensor (PS) may be disposed, which has both ends connected to a source node (E1 or E2) and a drain node (E2 or E1) of the switching transistor (SWT).

Figure 21:
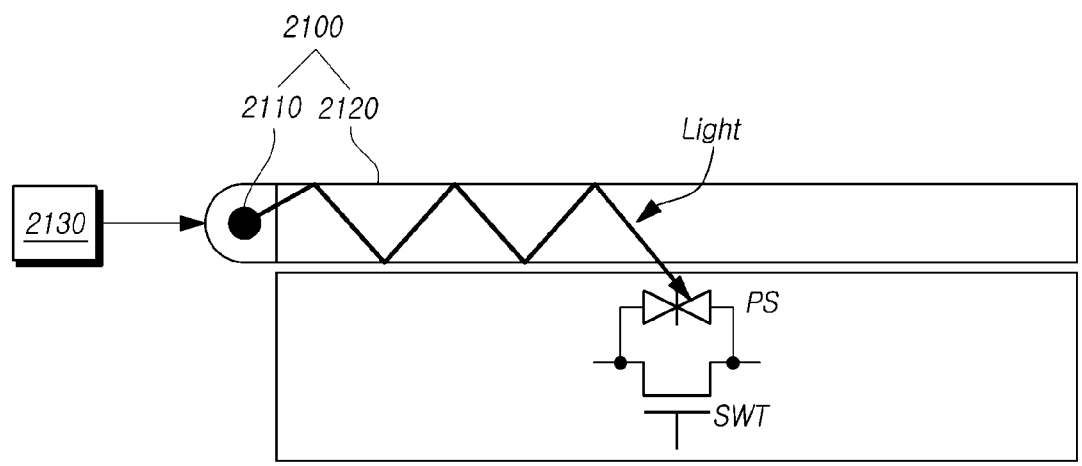
FIG. 21 illustrates a light irradiation device of a display device according to the present disclosure.

Referring to FIG. 21, the display device 100 according to the present disclosure may include the light irradiation device 2100 that radiates light to the optical sensor (PS).

The light irradiation device 2100 may include a light output device 2110 that outputs light and a light guide device 2110 that guides the light output from the light output device 2120 to the pixel area (PA) in which the optical sensor (PS) is disposed.

The light guide device 2120 is similar to a light guide plate and may be disposed on a layer where the switching transistor (SWT) is formed.

The light output from the light output device 2110 is totally reflected by the light guide device 2120 and is transmitted to the pixel area (PA) where the optical sensor (PS) is disposed.

Here, the light guide device 2120 may be disposed on a layer where the switching transistor (SWT) is formed.

Referring to FIG. 21, the display device 100 according to the present disclosure may further include a light output timing control device 2130 for controlling the timing (light irradiation timing) at which light is output from the light output device 2110.

The light output timing control device 2130 may be a micro control unit 1020 or a controller 140.

The optical sensor (PS) has a property of reacting to light, that is, photosensitivity. Here, the reaction to light (light reaction) means a change in electrical characteristics.

In the display device 100 according to the present disclosure, the optical sensor (PS) is photosensitive to light in a particular wavelength band.

The optical sensor (PS) operates as a nonconductor before light irradiation. When irradiated with light, the optical sensor (PS) operates as a conductor, so that the electrical characteristics are changed and the two ends thereof are electrically connected. Here, the optical sensor (PS) is also referred to as a photo sensor.

Therefore, when a gate signal of a turn-off level voltage (VGL) is applied to the gate node (E3) of the switching transistor (SWT) and a potential difference occurs between a first node (E1) and a second node (E2) of the switching transistor (SWT), if the optical sensor (PS) is irradiated with light, the optical sensor (PS) may generate a leakage current (Ioff) between the first node (E1) and the second node (E2) of the switching transistor (SWT).

The type of light applied to the optical sensor (PS) may be determined depending on the material of the optical sensor (PS).

The light applied to the optical sensor (PS) may be, for example, visible rays or infrared rays.

When the optical sensor (PS) is a material that is responsive to visible rays (for example, amorphous silicon), light for irradiation may be determined to be visible rays.

When the optical sensor (PS) is a material that is responsive to infrared rays (for example, amorphous silicon and n+ or p+ doped amorphous silicon), light for irradiation may be determined to be infrared rays.

As described above, effective irradiation light is selected in consideration of the degree of photoreactivity depending on the material of the optical sensor (PS), thereby improving touch-sensing performance using the optical sensor (PS).

Meanwhile, when a touch occurs around the pixel area (PA) where the optical sensor (PS) is disposed, the conductivity of the optical sensor (PS) that is irradiated with light may be changed.

When a touch occurs around the pixel area (PA) where the optical sensor (PS) is disposed, the conductivity of the optical sensor (PS) that is irradiated with light may be respectively different for the ridges and valleys of the fingerprint.

A fingerprint-sensing circuit 420 may obtain fingerprint information based on a difference in the conductivity of the optical sensor (PS) depending on the ridges and valleys of the fingerprint (that is, a difference in the level of leakage current).

As described above, by combining the optical method with the capacitance method, noise from a parasitic capacitor or the like has a smaller effect, thus enhancing the accuracy of fingerprint sensing.

Figure 22A:
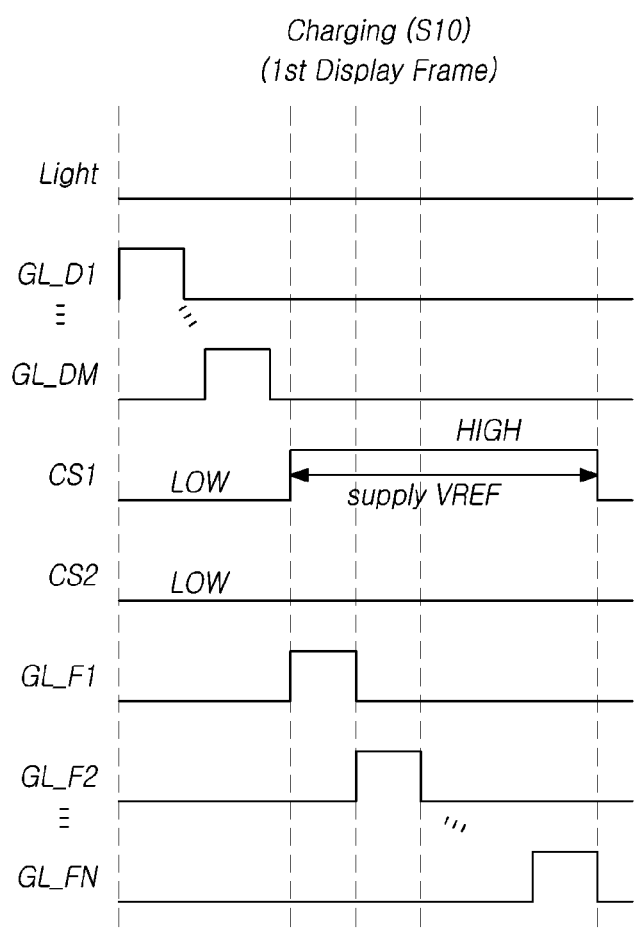
FIGS. 22A and 22B are operation timing diagrams of a third fingerprint-sensing operation of a display device according to the present disclosure.
Figure 22B:
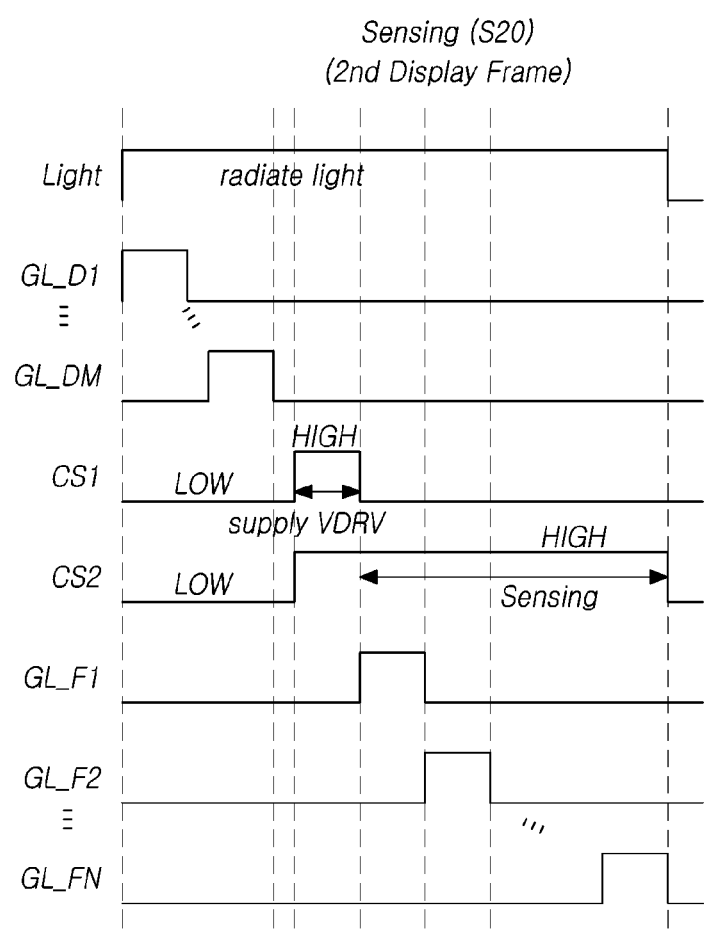

FIGS. 22A and 22B are operation timing diagrams of the third fingerprint-sensing operation of the display device 100 according to the present disclosure.

The operation timing diagrams illustrated in FIGS. 22A and 22B are basically the same as the operation timing diagrams illustrated in FIGS. 18A and 18B, except that a signal waveform related to light irradiation timing is added.

Referring to FIGS. 22A and 22B, a fingerprint-sensing mode period includes a charging period S10 and a sensing period S20.

Referring to FIG. 22A, during the charging period S10, a gate-driving circuit 130 sequentially supplies a gate signal (GATE) of a turn-on level voltage to N gate lines GL_F1 to GL_FN, and a driving voltage supply circuit 410 supplies a driving voltage (VDRV) to Q data lines DL_P+1 to DL_P+Q.

Referring to FIG. 22B, during the sensing period S20, the light irradiation device 2100 irradiates light to the optical sensor (PS), the gate-driving circuit 130 sequentially supplies a gate signal (GATE) of a turn-on level voltage to the N gate lines GL_F1 to GL_FN, the driving voltage supply circuit 410 does not supply a driving voltage (VDRV) to the Q data lines DL_P+1 to DL_P+Q, and the fingerprint-sensing circuit 420 is electrically connected to the Q data lines DL_P+1 to DL_P+Q to detect a signal from the Q data lines DL_P+1 to DL_P+Q.

Hereinafter, the aforementioned fingerprint sensing and operation methods therefor will be briefly described.

Figure 23:
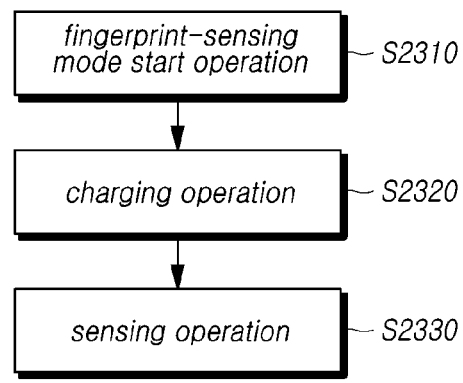
FIG. 23 is a schematic flowchart of an operation method of a display device according to the present disclosure.

FIG. 23 is a schematic flowchart of an operation method of a display device 100 according to the present disclosure.

Referring to FIG. 23, the operation method of the display device 100 according to the present disclosure may include: a fingerprint-sensing mode (fingerprint-sensing event) start operation (S2310) of recognizing the occurrence of a start event with respect to a fingerprint-sensing mode for detecting fingerprint information in an area including a pixel area (PA) defined by N (N being a natural number of 1 or greater) gate lines among H gate lines GL_1 to GL_H and Q (Q being a natural number of 1 or greater) data lines among K data lines DL_1 to DL_K; a charging operation (S2320) of sequentially supplying a gate signal (GATE) of a turn-on level voltage to the N gate lines GL_F1 to GL_FN and of supplying a driving voltage (VDRV), different from an image data voltages (DATA), to the Q data lines DL_P+1 to DL_P+Q; and a sensing operation (S2330) of sequentially supplying a gate signal (GATE) of a turn-on level voltage to the N gate lines GL_F1 to GL_FN, of supplying no driving voltage (VDRV) to the Q data lines DL_P+1 to DL_P+Q, and of detecting a signal from the Q data lines DL_P+1 to DL_P+Q.

The start event with respect to the fingerprint-sensing mode may occur by various functions of the display device 100, various applications, and the like.

For example, in a mobile device such as a smartphone, when a lock screen release function is executed, the start event with respect to the fingerprint-sensing mode may occur.

In another example, the start event with respect to the fingerprint-sensing mode (fingerprint-sensing event) may occur when a user is authenticated in a web browser program, an application store application, a product purchase application, a banking application, and the like.

Using the foregoing operation method, fingerprint information may be detected by appropriately driving the N gate lines GL_F1 to GL_FN and the Q data lines DL_P+1 to DL_P+Q, which are used for a fingerprint-sensing operation, and by detecting a signal through the Q data lines DL_P+1 to DL_P+Q with respect to a fingerprint-sensing area (FPSA) defined by the N gate lines GL_F1 to GL_FN and the Q data lines DL_P+1 to DL_P+Q.

In the sensing operation (S2330), a reference voltage (VREF) may be supplied to the Q data lines DL_P+1 to DL_P+Q before a signal of the Q data lines DL_P+1 to DL_P+Q is detected.

Figure 24:
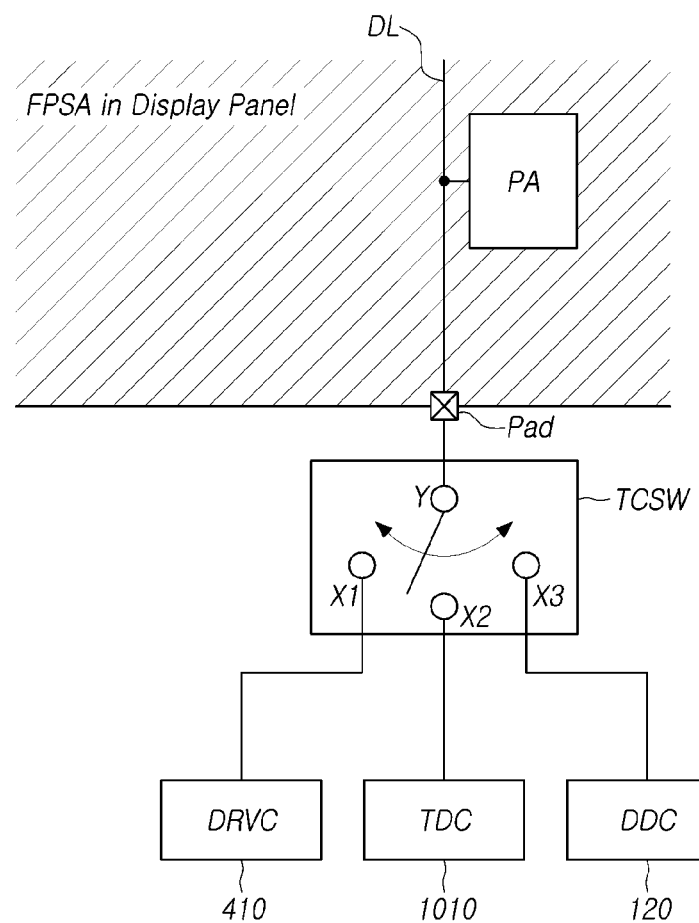
FIG. 24 illustrates a circuit for fingerprint sensing according to the present disclosure.

FIG. 24 illustrates a circuit for fingerprint sensing according to the present disclosure.

Referring to FIG. 24, the circuit for fingerprint sensing according to the present disclosure may include a first circuit 410 that supplies a driving voltage (VDRV) to Q data lines DL_P+1 to DL_P+Q for a fingerprint-sensing operation among K data lines DL_1 to DL_K and a second circuit 1010 that detects a signal of the Q data lines DL_P+1 to DL_P+Q.

Using the first circuit 410 and the second circuit 1010, it is possible to detect fingerprint information by driving the Q data lines DL_P+1 to DL_P+Q for a fingerprint-sensing operation.

The second circuit 1010 may supply a reference voltage (VREF) to the Q data lines DL_P+1 to DL_P+Q before detecting a signal of the Q data lines DL_P+1 to DL_P+Q.

Therefore, a parasitic capacitance component is removed from the Q data lines DL_P+1 to DL_P+Q, thereby increasing the accuracy of fingerprint information obtained based on the signal detected through the Q data lines DL_P+1 to DL_P+Q.

Also, since a signal of the Q data lines DL_P+1 to DL_P+Q is detected after resetting the voltage of the Q data lines DL_P+1 to DL_P+Q to the reference voltage (VREF) right before the detection of the signal from the Q data lines DL_P+1 to DL_P+Q, the accuracy of fingerprint information obtained based on the detected signal may be increased.

Referring to FIG. 24, the circuit for fingerprint sensing according to the present disclosure may further include a third circuit 120 that supplies an image data voltage (DATA) to the K data lines DL_1 to DL_K.

Therefore, not only a fingerprint sensing operation but also a display operation may be provided.

Referring to FIG. 24, the circuit for fingerprint sensing according to the present disclosure may further include a timing control switch circuit (TCSW) for each of the Q data lines DL_P+1 to DL_P+Q.

The timing control switch circuit (TCSW) may control the electrical connection of a corresponding data line among the Q data lines DL_P+1 to DL_P+Q with the first circuit 410 (electrical connection of point X1 to point Y), the electrical connection of the corresponding data line with the second circuit 1010 (electrical connection of point X2 to point Y), and the electrical connection of the corresponding data line with the third circuit 120 (electrical connection of point X3 to point Y).

The timing control switch circuit (TCSW) may be configured to include one or more switch elements.

Using the foregoing timing control switch circuit (TCSW), it is possible to effectively provide a display operation and a fingerprint-sensing operation (the supply of a driving voltage and the detection of a signal) with respect to the Q data lines DL_P+1 to DL_P+Q.

Figure 25:
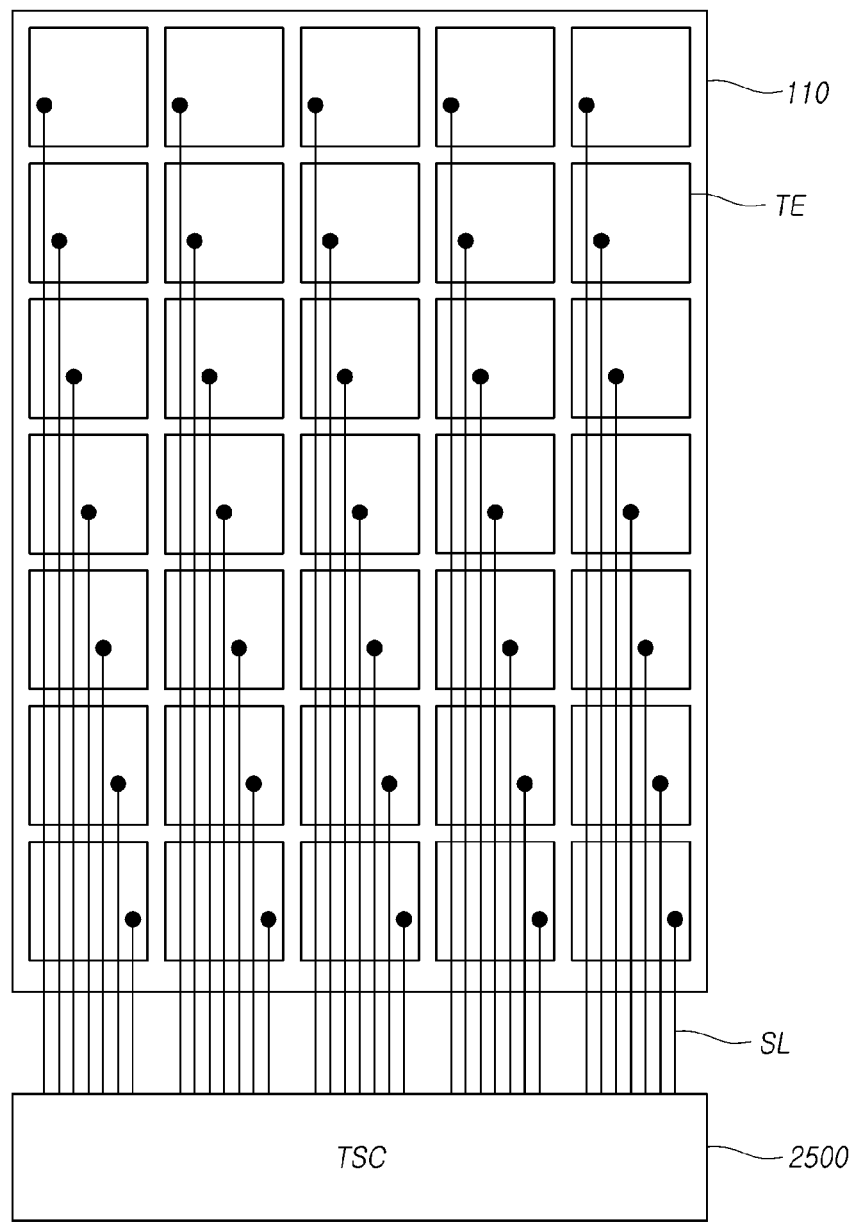
FIG. 25 illustrates a touch-sensing configuration of a display device according to the present disclosure.

FIG. 25 illustrates a touch-sensing configuration of a display device 100 according to the present disclosure.

Referring to FIG. 25, the display device 100 according to the present disclosure may further include a plurality of touch electrodes (TE) disposed on a display panel 110 and a touch-sensing circuit (TSC) 2500 that drives at least one of the plurality of touch electrodes (TE) and detects the occurrence of a touch by a finger or a touch object (for example, a pen) or the coordinates of a touch.

Further, a plurality of signal lines (SL) that electrically connects the plurality of touch electrodes (TE) and the touch-sensing circuit 2500 may be disposed on the display panel 110.

The display device 100 according to the embodiments of the present invention may detect the occurrence of a touch by a finger or a touch object (for example, a pen) or the coordinates of a touch using a self-capacitance-based touch-sensing mode or a mutual capacitance-based touch-sensing mode.

For example, when the display device 100 according to the present disclosure detects the occurrence of a touch by a finger or a touch object (for example, a pen) or the coordinates of a touch using the self-capacitance-based touch-sensing mode, the touch-sensing circuit 2500 may apply a driving signal to at least one of the plurality of touch electrodes (TE), may detect a signal from the touch electrode (TE), to which the driving signal has been applied, and may detect the occurrence of a touch or the coordinates of a touch based on the detected signal.

In another example, when the display device 100 according to the present disclosure detects the occurrence of a touch by a finger or a touch object (for example, a pen) or the coordinates of a touch using the mutual capacitance-based touch-sensing mode, the touch-sensing circuit 2500 may apply a driving signal to at least one touch electrode for driving of the plurality of touch electrodes (TE), may detect a signal from at least one touch electrode for sensing of the plurality of touch electrodes (TE), and may detect the occurrence of a touch or the coordinates of a touch based on the detected signal.

The touch-sensing circuit 2500 may have, from the aspect of an internal circuit configuration, a circuit configuration (AMP, INTG, SHA, and ADC) that is the same as or similar to that of the fingerprint-sensing circuit (FPSC) of FIG. 5A. The configurations of the two circuits may be substantially the same except that a wire electrically connected to an inverting input terminal (−) of an amplifier (AMP) is the signal lines (SL) in the touch-sensing circuit 2500 and is the data lines (DL) in the fingerprint-sensing circuit (FPSC).

Figure 26:
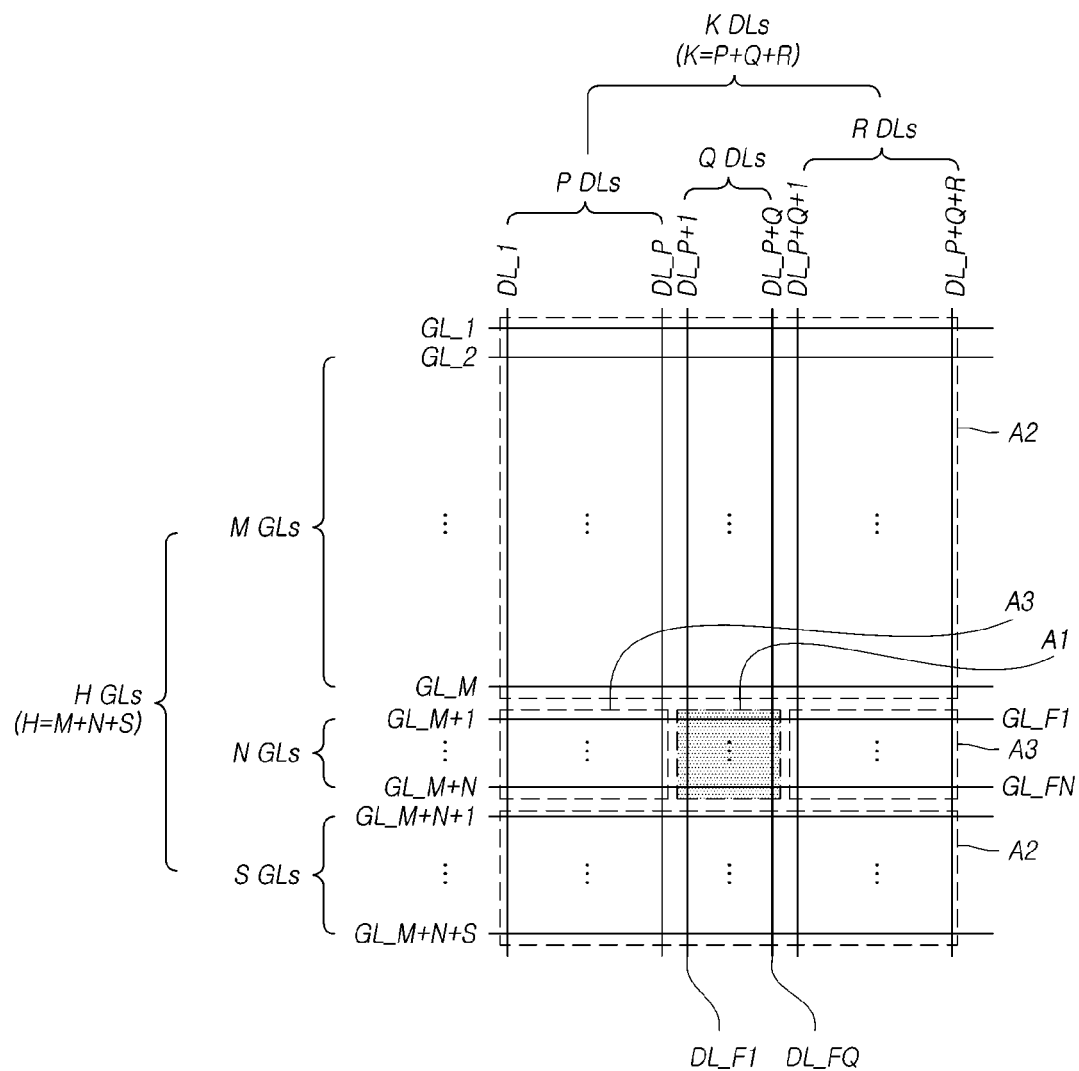
FIGS. 26 and 27 illustrate the position of a fingerprint-sensing area on a display panel according to the present disclosure.
Figure 27:
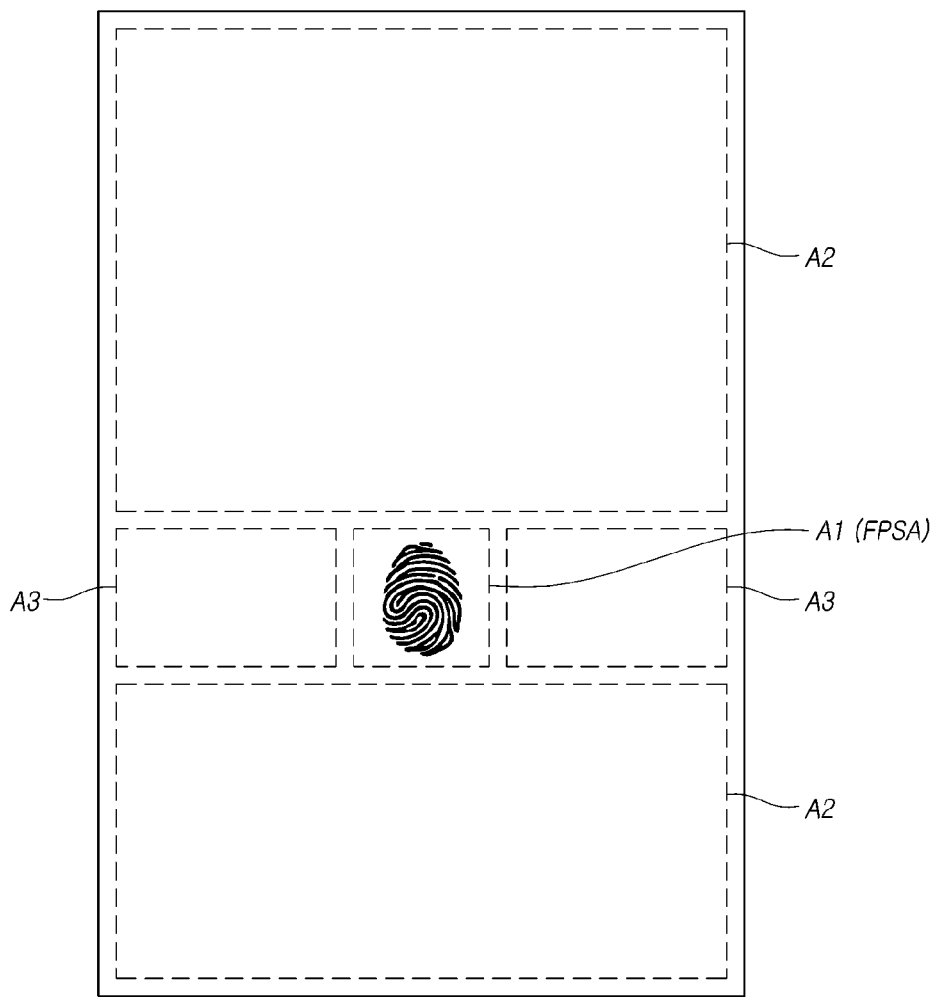

FIGS. 26 and 27 illustrate the position of a fingerprint-sensing area (FPSA) on a display panel 110 according to the present disclosure.

In the example of FIGS. 26 and 27, a first area A1 corresponding to the fingerprint-sensing area (FPSA) may be disposed at a position within the entire area of the screen, instead of being disposed at one side of the entire area of the screen as illustrated in FIG. 9.

A detailed description will be made below with reference to FIGS. 26 and 27.

Referring to FIG. 26, K data lines and H gate lines are disposed on the display panel 110 according to the embodiments of the present invention, where K is a natural number of 2 or greater and H is a natural number of 2 or greater.

Referring to FIG. 26, the H gate lines may include: M gate lines including a first gate line GL_1 to an Mth gate line GL_M; N gate lines including an (M+1)th gate line GL_M+1 to an (M+N)th gate line GL_M+N; and S gate lines including an (M+N+1)th gate line GL_M+N+1 to an (M+N+S)th gate line GL_M+N+S. Here, each of M and S may be 0 or a natural number of 1 or greater, and M+S may be 1 or greater. N may be a natural number of 1 or greater, and M+N+S may be H.

Referring to FIG. 26, the K data lines may include: P data lines including a first data line DL_1 to a Pth data line DL_P; Q data lines including a (P+1)th data line DL_P+1 to a (P+Q)th data line DL_P+Q; and R data lines including a (P+Q+1)th data line DL_P+Q+1 to a (P+Q+R)th data line DL_P+Q+R. Here, each of P and R may be 0 or a natural number of 1 or greater, and P+R may be 1 or greater. Q may be a natural number of 1 or greater, and P+Q+R may be K.

The N gate lines GL_M+1 to GL_M+N are gate lines used not only for a display operation but also for a fingerprint-sensing operation, and may also be referred to as GL_F1 to GL_FN.

The Q data lines DL_P+1 to DL_P+Q are data lines used not only for a display operation but also for a fingerprint-sensing operation, and may also be referred to as DL_F1 to DL_FQ.

The first area A1 including a pixel area defined by the N gate lines GL_F1 to GL_FN and the Q data lines DL_F1 to DL_FQ may be a display area and a fingerprint-sensing area (FPSA).

A second area A2 including a pixel area defined by (H-N) gate lines, excluding the N gate lines GL_F1-GL_FN, among the H gate lines, and the K data lines may be a display area.

A third area A3 including a pixel area (PA) defined by (K-Q) data lines, excluding the Q data lines DL_F1 to DL_FQ, among the K data lines, and the N gate lines GL_F1 to GL_FN may be a display area.

Referring to FIGS. 26 and 27, when S is not 0, the second area A2 may be disposed on both of opposite sides of each of the first area A1 and the third area A3.

When S is 0, the display panel 110 may be the same as that of FIG. 9. In this case, the second area A2 may be disposed on only one side of each of the first area A1 and the third area A3.

While the size, number, and position of the first area A1 corresponding to the fingerprint-sensing area (FPSA) may always be fixed, at least one of the size, number, and position of the first area A1 may be changed variously.

Further, at least one of the size, number, and position of the first area A1 corresponding to the fingerprint-sensing area (FPSA) may be changed with time or depending on the situation.

An operation method for fingerprint sensing of the display device 100 according to the present disclosure is not a method considering a touch operation for detecting touch coordinates but a method of sensing a fingerprint in accordance with a gate operation, in which fingerprint sensing is performed in an area (fingerprint-sensing area) of the display area. That is, in the display device 100 according to the embodiments of the present invention, a detection sensor using a pixel structure is disposed in an area of the display area.

In the display device 100 according to the present disclosure, a fingerprint-sensing operation for fingerprint sensing may be performed in real time as a touch operation for detecting touch coordinates but may not need to be continuously performed in real time.

When the fingerprint-sensing operation is continuously performed in real time as the touch operation, it is necessary to allocate a separate time period for touch sensing, making it difficult to secure the time to charge a display that has high resolution.

Hereinafter, timings for a fingerprint-sensing operation of the display device 100 according to the present disclosure are illustrated.

Figure 28:
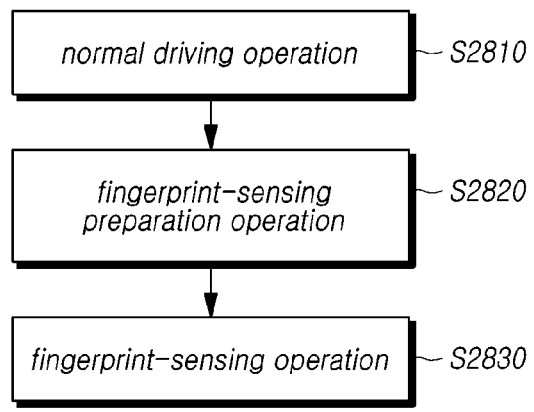
FIG. 28 is a flowchart of an operation method of a display device according to the present disclosure.
Figure 29:
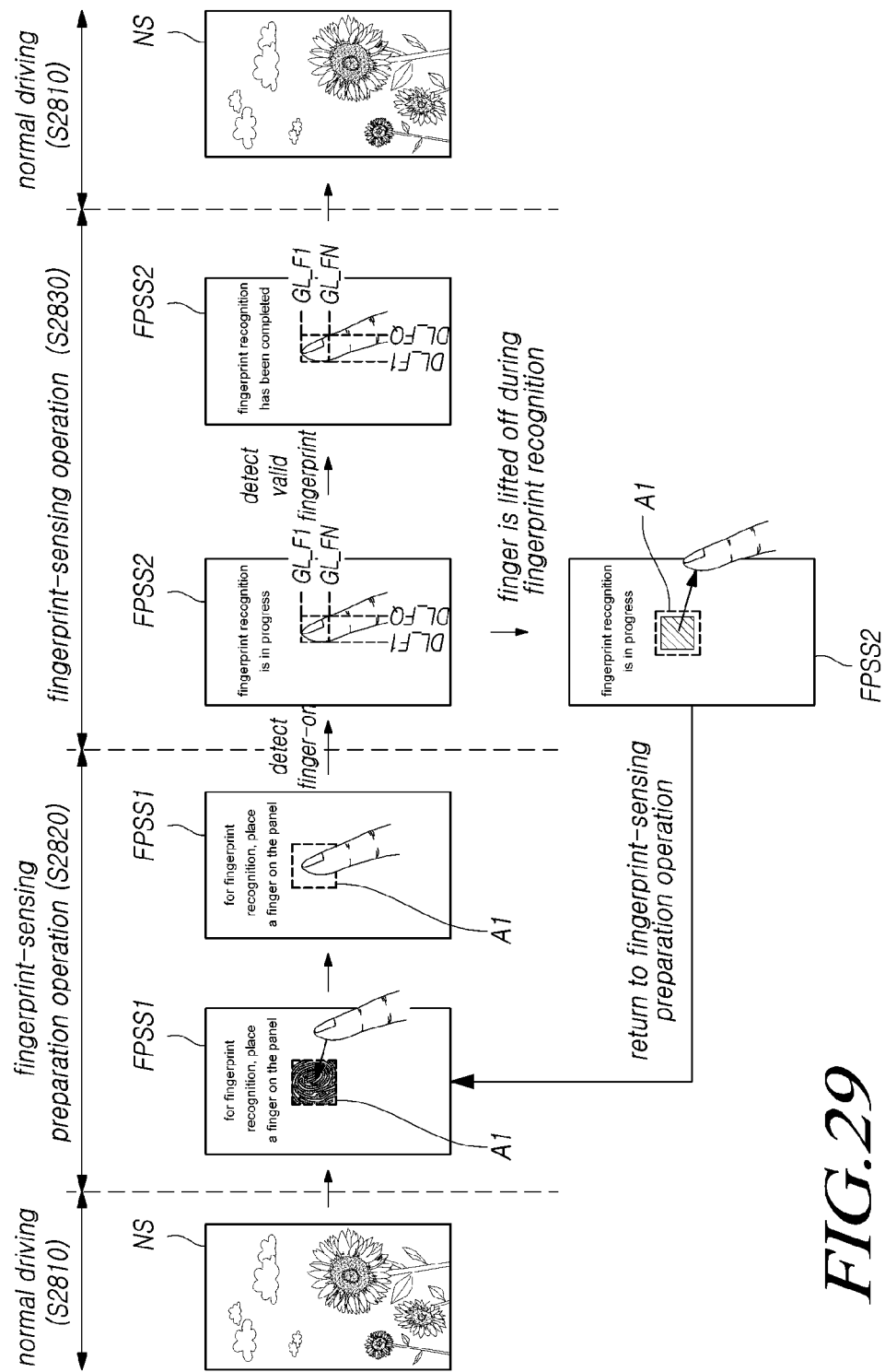
FIG. 29 illustrates a fingerprint-sensing scenario of a display device according to the present disclosure.
Figure 30:
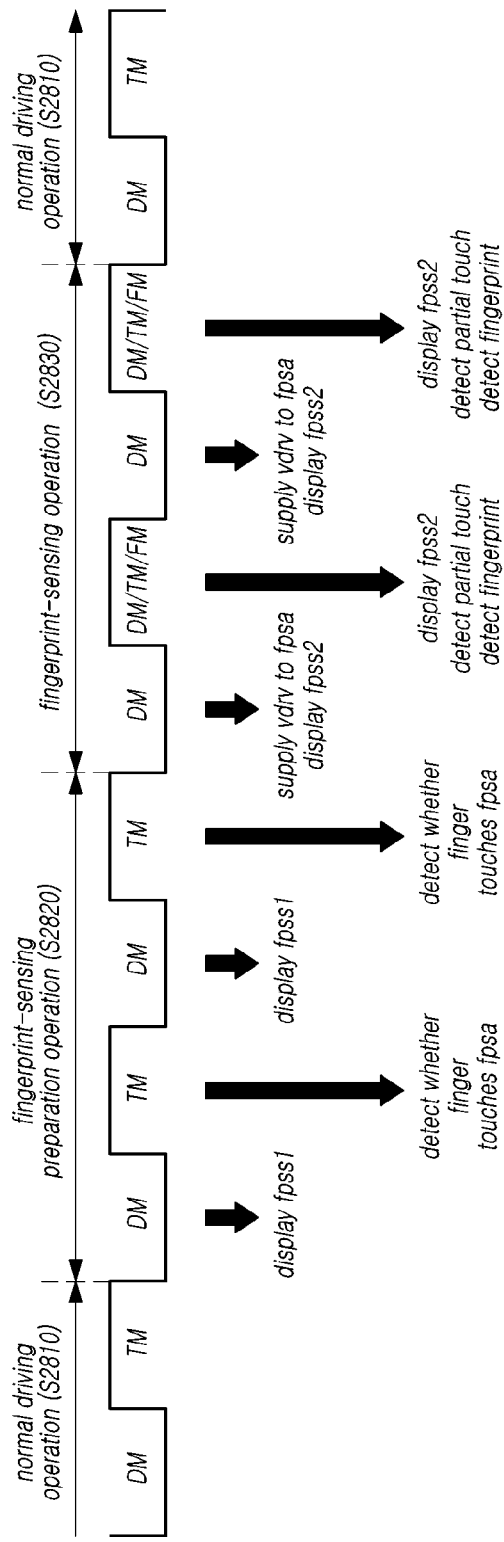
FIGS. 30 and 31 are operation timing diagrams of a fingerprint-sensing scenario of a display device according to the present disclosure.
Figure 31:
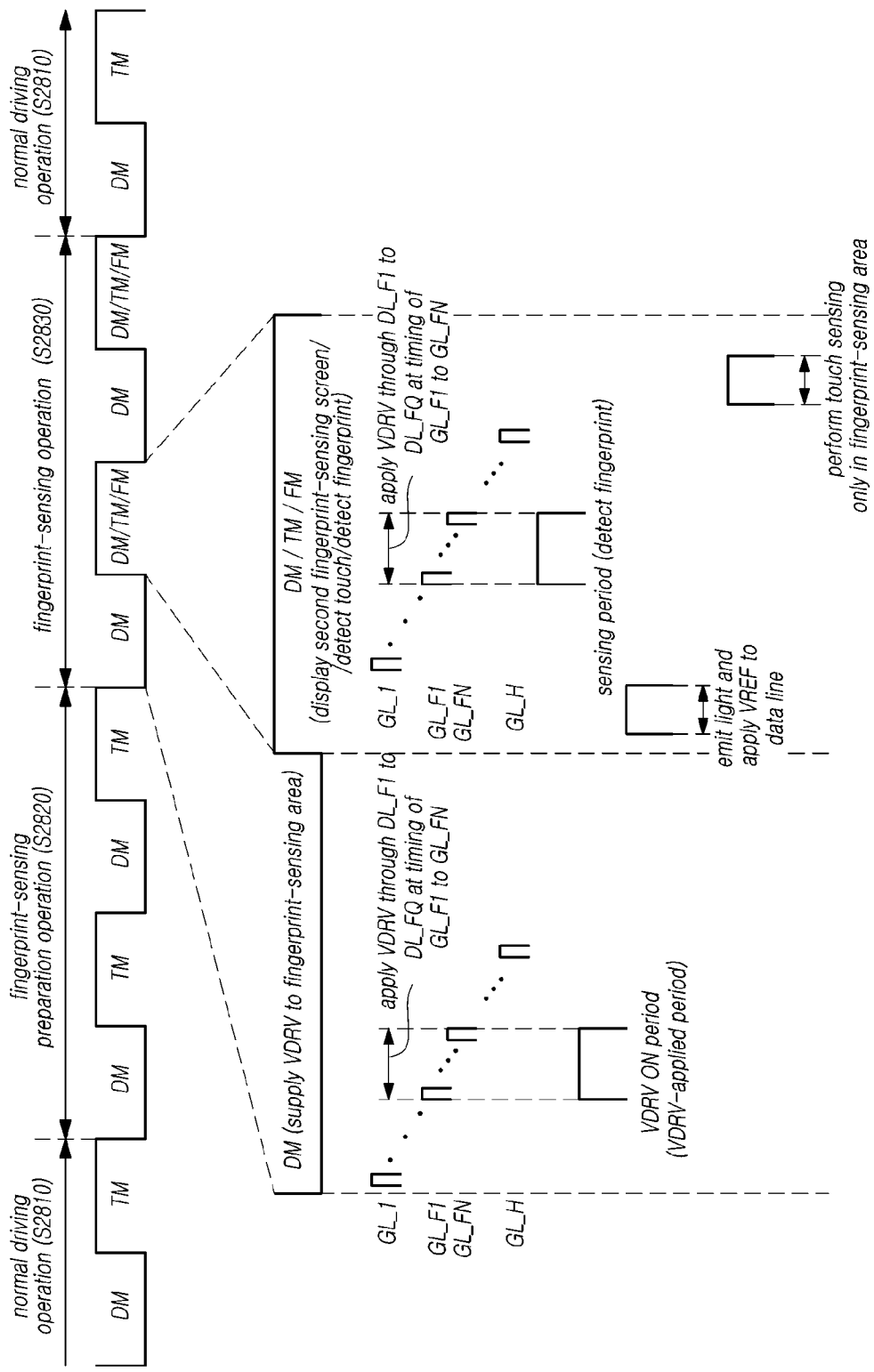

FIG. 28 is a flowchart of an operation method of a display device 100 according to the present disclosure; FIG. 29 illustrates a fingerprint-sensing scenario of the display device 100 according to embodiments of the present invention; and FIGS. 30 and 31 are operation timing diagrams of the fingerprint-sensing scenario of the display device 100 according to embodiments of the present invention.

Briefly describing the operation method for fingerprint sensing of the display device 100 according to the present disclosure, when a fingerprint-sensing event occurs, a fingerprint-sensing circuit 420 sets a first area A1 that is a fingerprint-sensing area (FPSA). When a touch-sensing circuit 2500 detects a touch by a finger in the first area A1 set as the fingerprint-sensing area (FPS A), the fingerprint-sensing circuit 420 detects fingerprint information in the first area A1.

In detail, referring to FIGS. 28 and 29, the operation method of the display device 100 according to the present disclosure may include: a normal driving operation S2810, a fingerprint-sensing preparation operation S2820, and a fingerprint-sensing operation S2830.

In the normal driving operation (S2810), when a fingerprint-sensing event occurs, the display device 100 according to the present disclosure may perform a display mode (DM) for normal image display and a touch-sensing mode (TM) for detecting the occurrence of a touch by a finger or a touch object or the coordinates of a touch at separate times or simultaneously.

In a display-mode period, in which the display mode (DM) is performed, the display device 100 may drive sub-pixels disposed on a display panel 110 using a data-driving circuit 120 and a gate-driving circuit 130. Accordingly, in the normal driving operation S2810, a normal image (NS) may be displayed on the display panel 110.

In a touch-sensing mode period, in which the touch-sensing mode (TM) is performed, using a touch-sensing circuit 2500, the display device 100 may apply a driving signal to at least one of a plurality of touch electrodes (TE) disposed on the display panel 110, may detect a sensing signal from at least one of the plurality of touch electrodes (TE), and may detect the occurrence of a touch by a finger or a touch object or the coordinates of a touch based on the detected signal.

As described above, the display mode (DM) and the touch-sensing mode (TM) may be performed at separate times in different time periods, as illustrated in FIGS. 30 and 31, or may be performed simultaneously in the same time period.

When a given fingerprint-sensing event occurs during the normal driving operation S2810, the fingerprint-sensing preparation operation S2820 is performed.

Here, the fingerprint-sensing event may occur, for example, in a user authentication procedure for an application running on the display device 100.

Here, the application may be, for example, a web browser program, an application associated with application stores, an application associated with product purchases, an application associated with banking or stocks, an application associated with games, music, or education, or the like.

In the fingerprint-sensing preparation operation S2820, when the occurrence of the fingerprint-sensing event is recognized, the display device 100 according to the embodiments of the present invention may set a first area A1, which is an area of the entire area of the screen, as a fingerprint-sensing area (FPSA), may detect whether a touch by a finger is made in the first area A1 set as the fingerprint-sensing area (FPSA), and may display a first fingerprint-sensing screen (FPSS1) that changes based on a result of detecting whether a touch by a finger is made in the first area A1 set as the fingerprint-sensing area (FPSA).

Here, the first fingerprint-sensing screen (FPSS1) may display a fingerprint recognition instruction expression, for example, "For fingerprint recognition, place a finger on the panel", and may display a separate area for placing a finger (corresponding to the fingerprint-sensing area (FPSA)).

When no touch by a finger is detected in the first area A1 set as the fingerprint-sensing area (FPSA) for a certain period of time or input (for example, user input) indicating that fingerprint recognition is not necessary occurs during the fingerprint-sensing preparation operation S2820, the display device 100 may return to the normal driving operation S2810.

When a touch by a finger (finger-on) is detected in the first area A1 set as the fingerprint-sensing area (FPSA) during the fingerprint-sensing preparation operation S2820, the fingerprint-sensing operation S2820 is performed.

In the fingerprint-sensing operation S2830, when a touch by a finger is detected in the first area A1 set as the fingerprint-sensing area (FPSA), the display device 100 according to embodiments of the present invention may detect fingerprint information in the first area A1 set as the fingerprint-sensing area (FPSA) and may display a second fingerprint-sensing screen (FPSS2) that changes based on a result of detecting fingerprint information.

Here, the second fingerprint-sensing screen (FPSS2) may display a fingerprint recognition process instruction expression or a fingerprint recognition result, for example, "Fingerprint recognition is in progress", "Fingerprint recognition has been completed", or "Fingerprint recognition failed", which changes with a fingerprint recognition process.

The fingerprint-sensing operation S2830 is described in detail with reference to FIGS. 29 and 30.

In the fingerprint-sensing operation S2830, a display-mode (DM) period and a display-mode/touch-sensing mode/fingerprint-sensing mode (DM/TM/FM) period may be alternately performed.

In the DM period, the second fingerprint-sensing screen (FPSS2) displaying an instruction expression of "Fingerprint recognition is in progress" may be output through areas A2 and A3 other than the first area A1 set as the fingerprint-sensing area (FPSA).

Further, in the DM period, a driving voltage (VDRV, for example, 5 V) for fingerprint sensing, instead of a data voltage for a display operation, is applied to data lines DL_F1 to DL_FQ corresponding to the first area A1 set as the fingerprint-sensing area (FPSA) in accordance with the operation timing of gate lines GL_F1 to GL_FN corresponding to the first area A1 set as the fingerprint-sensing area (FPSA).

Since a user's finger covers the fingerprint-sensing area (FPSA) during the fingerprint-sensing operation S2830, even though the state of an image is abnormal in the first area A1 set as the fingerprint-sensing area (FPSA) due to no application of a data voltage for a display operation to the first area A1, the user does not recognize the abnormal state of the image. The DM period corresponds to the charging period S10 in FIGS. 15A and 18A.

The DM/TM/FM period following the DM period is a period in which a display operation, a touch operation for touch sensing, and a fingerprint operation for fingerprint sensing are performed in combination.

In the DM/TM/FM period, light irradiation is performed and a reference voltage (VREF) is applied to the data lines, after which a gate operation is further performed, thus performing fingerprint sensing in the fingerprint-sensing area (FPSA).

In the DM/TM/FM period, the gate lines need to be sequentially driven for a display operation and a fingerprint operation.

In the DM/TM/FM period, when gate lines disposed corresponding to the area A2 other than the first area A1 set as the fingerprint-sensing area (FPSA) are turned on, the same data voltage for a display operation as the one output in the DM period may be applied to corresponding data lines in order to output the second fingerprint-sensing screen (FPSS2).

In the DM/TM/FM period, the data lines DL_F1 to DL_FQ disposed in the first area A1 set as the fingerprint-sensing area (FPSA) may be driven for fingerprint sensing, instead of receiving a data voltage for a display operation, in accordance with the operation timing of the gate lines GL_F1 to GL_FN disposed in the first area A1 set as the fingerprint-sensing area (FPSA).

In the DM/TM/FM period, the data lines DL_F1 to DL_FQ disposed in the first area A1 set as the fingerprint-sensing area (FPSA) may be detected by the fingerprint-sensing circuit 420.

In the DM/TM/FM period, the touch-sensing circuit 2500 partly performs a touch operation only on the first area A1 set as the fingerprint-sensing area (FPSA), thereby checking whether the user's finger is continuously in contact with the screen in the fingerprint-sensing area (FPSA).

When the user removes the finger from the fingerprint-sensing area (FPSA) while fingerprint sensing is still ongoing, the display device 100 immediately returns to the fingerprint-sensing preparation operation S2820 in order to minimally expose an abnormal display state in the fingerprint-sensing area (FPSA).

When fingerprint sensing is normally completed, the display device 100 returns to the normal driving operation S2810. The DM/TM/FM period corresponds to sensing period S20 in FIGS. 15B and 18B.

When the fingerprint-sensing operation S2830 is completed, the normal driving operation S2810 may be repeated.

As described above, when the fingerprint-sensing operation S2830 is started and a finger touching the first area A1 set as the fingerprint-sensing area (FPSA) is removed from the screen (the finger is lifted off the screen during fingerprint sensing) before fingerprint sensing is completed, the display device 100 may return to the fingerprint-sensing preparation operation S2820 or the normal driving operation S2810.

The display device 100 according to the embodiments of the present invention may be a liquid crystal display device having a sub-pixel structure illustrated in FIGS. 3A and 3B but may be an organic light-emitting display (OLED) device.

Hereinafter, in the case where a display device 100 according to an embodiment of the present invention is an OLED device, a fingerprint-sensing sensor structure is described with reference to FIG. 32.

Figure 32:
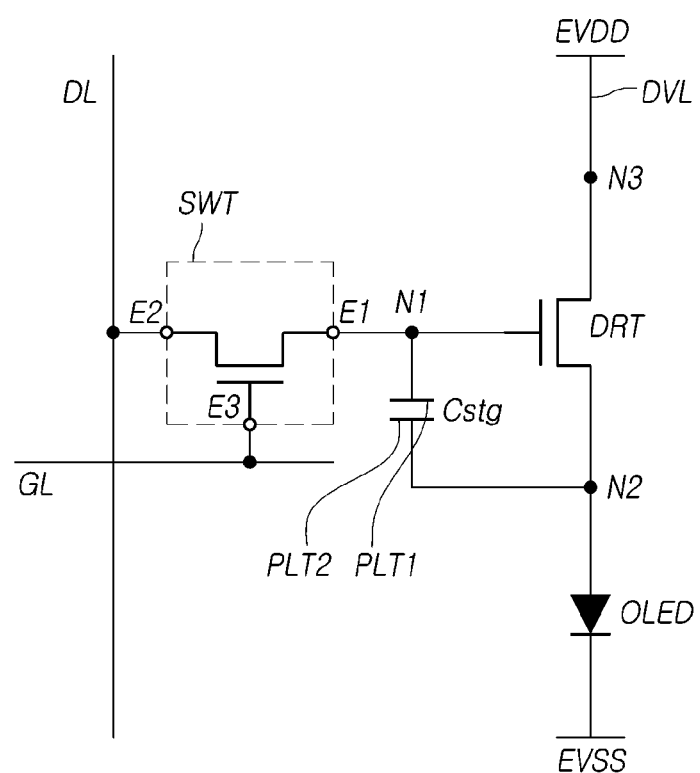
FIG. 32 is an equivalent circuit for a fingerprint-sensing sensor structure when a display device according to the present disclosure is an Organic Light-Emitting Display (OLED) device.

FIG. 32 is an equivalent circuit for a fingerprint-sensing sensor structure when a display device 100 according to embodiments of the present invention is an organic light-emitting display device.

Referring to FIG. 32, a sub-pixel may include an organic light-emitting diode (OLED), a driving transistor (DRT) that drives the organic light-emitting diode (OLED), a switching transistor (SWT) electrically connected to a first node (N1) of the driving transistor (DRT) and to a data line (DL), and a storage capacitor (Cstg) electrically connected to the first node (N1) and a second node (N2) of the driving transistor (DRT).

The organic light-emitting diode (OLED) may include a first electrode connected to the second node (N2) of the driving transistor (DRT), an organic light-emitting layer, and a second electrode to which a base voltage (EVSS) is applied.

In the driving transistor (DRT), the first node (N1) is a gate node, the second node (N2) may be a source node or a drain node connected to the first electrode of the organic light-emitting diode (OLED), and a third node (N3) may be a drain node or a source node to which a driving voltage (EVDD) is applied.

The storage capacity (Cstg) may include a first plate (PLT1) electrically connected to the first node (N1) of the driving transistor (DRT) and a second plate (PLT2) electrically connected to the second node (N2) of the driving transistor (DRT).

In a turned-on state, the switching transistor (SWT) transmits an image data voltage to the first node (N1) of the driving transistor (DRT) from the data line (DL). The image data voltage transmitted to the first node (N1) of the driving transistor (DRT) is also applied to the first plate (PLT1) of the storage capacitor (Cstg).

Here, the first plate (PLT1) of the storage capacitor (Cstg) performs the same function as that of the pixel electrode (PXL) in the fingerprint-sensing sensor structure of FIGS. 3A and 3B.

The switching transistor (SWT) may include a first node (E1) electrically connected to the first plate (PLT1) of the storage capacitor (Cstg), a second node (E2) electrically connected to the data line (DL), a third node (E3) electrically connected to a gate line (GL), and a semiconductor layer having both ends in contact with the first node (E1) and the second node (E2).

The switching transistor (SWT) may be turned on or off according to a gate signal (also referred to as a scan signal) applied to the third node (E3) from the gate line (GL).

In the switching transistor (SWT), the first node (E1) may be a drain node (or source node) or a source node (or drain node). The second node (E2) may be a source node or a drain node. The third node (E3) may be a gate node.

The switching transistor (SWT) may be an n-type transistor or a p-type transistor.

In addition to the foregoing pixel structure or a modified pixel structure, the fingerprint-sensing sensor structure of FIG. 32 may further include an optical sensor (PS) electrically connected to the first node (E1) and the second node (E2) of the switching transistor (SWT) in the same manner as in FIG. 20.

According to the present disclosure described above, there may be provided a display device 100, a display panel 110, a fingerprint-sensing method, and a circuit for sensing a fingerprint, which can detect a fingerprint without including a separate fingerprint sensor outside a display panel 110.

According to the present disclosure, there may be provided a display device 100, a display panel 110, a fingerprint-sensing method, and a circuit for sensing a fingerprint, which detect a fingerprint in a portion (A1) of a display panel 110 that is designated as a fingerprint-sensing area (FPSA).

According to the present disclosure, there may be provided a display device 100, a display panel 110, a fingerprint-sensing method, and a circuit for sensing a fingerprint, which can detect a fingerprint using a pixel structure as a fingerprint-sensing structure.

According to the present disclosure, there may be provided a display device 100, a display panel 110, a fingerprint-sensing method, and a circuit for sensing a fingerprint, which can recognize a fingerprint within an application screen.

According to the present disclosure, there may be provided a display device 100, a display panel 110, a fingerprint-sensing method, and a circuit for sensing a fingerprint, which can detect a fingerprint not only on the basis of capacitance but also by an optical method.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A display device comprising:
    a display panel where K (K being a natural number of 2 or greater) data lines and H (H being a natural number of 2 or greater) gate lines are disposed, a plurality of pixel areas defined by the K data lines and the H gate lines, and a pixel electrode is disposed in each pixel area;
    a gate-driving circuit configured to drive the H gate lines;
    a data-driving circuit configured to drive the K data lines;
    a driving voltage supply circuit configured to supply a driving voltage to Q (Q being a natural number of 1 or greater) data lines among the K data lines; and
    a fingerprint-sensing circuit configured to detect fingerprint information during a fingerprint-sensing mode period in a first area comprising a pixel area defined by N (N being a natural number of 1 or greater) gate lines among the H gate lines and the Q data lines by detecting a signal from the Q data lines,
    wherein the fingerprint-sensing mode period comprises a charging period and a sensing period;
    during the charging period,
    the gate-driving circuit sequentially supplies a gate signal of a turn-on level voltage to the N gate lines, and the driving voltage supply circuit supplies the driving voltage to the Q data lines; and
    during the sensing period,
    the gate-driving circuit sequentially supplies a gate signal of a turn-on level voltage to the N gate lines,
    the driving voltage supply circuit supplies no driving voltage to the Q data lines, and
    the fingerprint-sensing circuit is electrically connected to the Q data lines to detect a signal from the Q data lines.

2. The display device of claim 1, wherein the H gate lines comprise M gate lines comprising a first gate line to an Mth gate line; N gate lines comprising an (M+1)th gate line to an (M+N)th gate line; and S gate lines comprising an (M+N+1)th gate line to an (M+N+S)th gate line, where M and S are 0 or a natural number of 1 or greater, M+S is 1 or greater, N is a natural number of 1 or greater, and M+N+S is H.

3. The display device of claim 1, wherein the K data lines comprise P data lines comprising a first data line to a Pth data line, Q data lines comprising a (P+1)th data line to a (P+Q)th data line, and R data lines comprising a (P+Q+1)th data line to a (P+Q+R)th data line, where P and R are each 0 or a natural number of 1 or greater, P+R is 1 or greater, Q is a natural number of 1 or greater, and P+Q+R is K.

4. The display device of claim 1, wherein the first area comprising the pixel area defined by the N gate lines and the Q data lines is a fingerprint-sensing area.

5. The display device of claim 2, wherein the pixel area defined by the M gate lines, excluding the N gate lines among the H gate lines, and the K data lines includes a second area being a display area.

6. The display device of claim 4, wherein the pixel area defined by (K-Q) data lines, excluding the Q data lines among the K data lines, and the N gate lines includes a third area being a display area.

7. The display device of claim 6, wherein the second area is disposed on only one side of each of the first area and the third area or is disposed on both of opposite sides of each of the first area and the third area.

8. The display device of claim 1, wherein the first area is a fingerprint-sensing area for detecting fingerprint information during the fingerprint-sensing mode period and is a display area for image display during a period other than the fingerprint-sensing mode period.

9. The display device of claim 1, wherein the first area is a fingerprint-sensing area for detecting fingerprint information during a fingerprint-sensing mode period, and the Q data lines and the N gate lines are driven during the fingerprint-sensing mode period for detecting the fingerprint information in a fingerprint-sensing area.

10. The display device of claim 9, wherein the fingerprint-sensing mode period overlaps a display-mode period for image display.

11. The display device of claim 9, wherein the fingerprint-sensing mode period overlaps a touch-sensing mode period for detecting an occurrence of a touch or a position of a touch.

12. The display device of claim 9, wherein the fingerprint-sensing mode period is present between a display mode period and a touch-sensing mode period.

13. The display device of claim 1, wherein the fingerprint-sensing circuit comprises:
    a signal detection circuit configured to detect a signal from the Q data lines; and
    a micro control unit configured to detect the fingerprint information using a detection result from the signal detection circuit.

14. The display device of claim 13, wherein the driving voltage supply circuit is included in one of the data-driving circuit, the signal detection circuit, the data-driving circuit, and the signal detection circuit.

15. The display device of claim 1, wherein, during the sensing period, the fingerprint-sensing circuit supplies a reference voltage to the Q data lines before detecting the signal from the Q data lines.

16. The display device of claim 1, further comprising:
    a switching transistor controlled by a gate signal applied to a gate node through a corresponding gate line among the N gate lines, and electrically connected to a corresponding data line among the Q data lines, and to a corresponding pixel electrode;
    an optical sensor, both ends of which are connected to a source node and a drain node of the switching transistor, are disposed in each pixel area comprised in the first area; and
    a light irradiation device configured to radiate light to the optical sensor.

17. The display device of claim 16, wherein the fingerprint-sensing mode period comprises a charging period and a sensing period;
during the charging period,
the gate-driving circuit sequentially supplies a gate signal of a turn-on level voltage to the N gate lines, and the driving voltage supply circuit supplies the driving voltage to the Q data lines; and
during the sensing period,
the light irradiation device radiates light to the optical sensor,
the gate-driving circuit sequentially supplies a gate signal of a turn-on level voltage to the N gate lines,
the driving voltage supply circuit supplies no driving voltage to the Q data lines, and
the fingerprint-sensing circuit is electrically connected to the Q data lines to detect a signal from the Q data lines.

18. The display device of claim 1, further comprising a timing control switch circuit for each of the Q data lines,
wherein the timing control switch circuit controls an electrical connection of a corresponding data line with the driving voltage supply circuit, an electrical connection of the corresponding data line with the fingerprint-sensing circuit, and an electrical connection of the corresponding data line with the data-driving circuit, and comprises one or more switch elements.

19. The display device of claim 18, wherein the timing control switch circuit operates according to a first control signal and a second control signal,
electrically connects the corresponding data line with the data-driving circuit so as to supply an image data voltage to the corresponding data line when the first control signal and the second control signal have a first level,
electrically connects the corresponding data line with the driving voltage supply circuit so as to supply the driving voltage to the corresponding data line when the first control signal has a second level and the second control signal has the first level, and
electrically connects the corresponding data line with the fingerprint-sensing circuit so as to control the fingerprint-sensing circuit to detect a signal of the corresponding data line when the first control signal has the first level and the second control signal has the second level.

20. The display device of claim 19, wherein the timing control switch circuit electrically connects the corresponding data line with the fingerprint-sensing circuit so as to control the fingerprint-sensing circuit to supply a reference voltage to the corresponding data line when the first control signal has the second level and the second control signal has the second level.

21. The display device of claim 1, further comprising:
a plurality of touch electrodes disposed on the display panel; and
a touch-sensing circuit configured to drive at least one of the plurality of touch electrodes and to detect an occurrence of a touch by a finger or a touch object or a coordinate of a touch,
wherein the fingerprint-sensing circuit: sets the first area as a fingerprint-sensing area upon an occurrence of a fingerprint-sensing event; and detects the fingerprint information in the first area when a touch by a finger is detected by the touch-sensing circuit in the first area set as the fingerprint-sensing area.

22. The display device of claim 21, wherein a display mode for normal image display and a touch-sensing mode for detecting an occurrence of a touch by a finger or a touch object or a coordinate of a touch are performed at separate times or simultaneously until the occurrence of the fingerprint-sensing event;
when the fingerprint-sensing event occurs, the first area is set as the fingerprint-sensing area and a first fingerprint-sensing screen is displayed; and
when the touch by the finger is detected by the touch-sensing circuit in the first area, the fingerprint information is detected by the touch-sensing circuit in the first area and a second fingerprint-sensing screen that changes based on a result of detecting the fingerprint information is displayed.

23. A display panel comprising:
K (K being a natural number of 2 or greater) data lines;
H (H being a natural number of 2 or greater) gate lines; and
a first area including a pixel area defined by N (N being a natural number of 1 or greater) gate lines among the H gate lines and Q (Q being a natural number of 1 or greater) data lines among the K data lines being a fingerprint-sensing area for detecting fingerprint information;
during a charging period within a fingerprint-sensing mode period, a gate signal of a turn-on level voltage is sequentially supplied to the N gate lines and a driving voltage, which is different from an image data voltage, is supplied to the Q data lines; and
during a sensing period within the fingerprint-sensing mode period, the gate signal of a turn-on level voltage is sequentially supplied to the N gate lines and the Q data lines are electrically connected to a fingerprint-sensing circuit.

24. An operation method of a display device comprising a display panel in which K (K being a natural number of 2 or greater) data lines are disposed, H (H being a natural number of 2 or greater) gate lines are disposed, a plurality of pixel areas defined by the K data lines and the H gate lines are arranged, and a pixel electrode is disposed in each pixel area, the method comprising:
performing a fingerprint-sensing mode start operation of recognizing an occurrence of a start event with respect to a fingerprint-sensing mode for detecting fingerprint information in an area comprising a pixel area defined by N (N being a natural number of 1 or greater) gate lines among the H gate lines and Q (Q being a natural number of 1 or greater) data lines among the K data lines;
performing a charging operation of sequentially supplying a gate signal of a turn-on level voltage to the N gate lines and of supplying a driving voltage, different from an image data voltage, to the Q data lines; and
performing a sensing operation of sequentially supplying a gate signal of a turn-on level voltage to the N gate lines, of supplying no driving voltage to the Q data lines, and of detecting a signal from the Q data lines.

25. A circuit for fingerprint sensing configured to detect fingerprint information during a fingerprint-sensing mode period in a first area comprising a pixel area defined by N (N being a natural number of 1 or greater) gate lines among the H gate lines and Q data lines by detecting a signal from the Q data lines, comprising:
a first circuit configured to supply a driving voltage to the Q (Q being a natural number of 1 or greater) data lines among K (K being a natural number of 2 or greater) data lines; and a second circuit configured to detect a signal of the Q data lines, wherein the fingerprint-sensing mode period comprises a charging period and a sensing period;

during the charging period, the gate-driving circuit sequentially supplies a gate signal of a turn-on level voltage to the N gate lines, and the driving voltage supply circuit supplies the driving voltage to the Q data lines; and during the sensing period, the gate-driving circuit sequentially supplies a gate signal of a turn-on level voltage to the N gate lines, the driving voltage supply circuit supplies no driving voltage to the Q data lines, and the fingerprint-sensing circuit is electrically connected to the Q data lines to detect a signal from the Q data lines.

26. The circuit for fingerprint sensing of claim 25, wherein the second circuit supplies a reference voltage to the Q data lines prior to detecting the signal of the Q data lines.

27. The circuit for fingerprint sensing of claim 25, further comprising a third circuit configured to supply an image data voltage to the K data lines.

28. The circuit for fingerprint sensing of claim 27, further comprising a timing control switch circuit for each of the Q data lines, wherein the timing control switch circuit controls an electrical connection of a corresponding data line with the first circuit, an electrical connection of the corresponding data line with the second circuit, and an electrical connection of the corresponding data line with the third circuit, and comprises one or more switch elements.

29. A display device comprising:

a display panel in which K (K being a natural number of 2 or greater) data lines and H (H being a natural number of 2 or greater) gate lines are disposed, and a pixel electrode is disposed; and a fingerprint-sensing circuit configured to receive a signal from Q data lines (Q being a natural number of 1 or greater) electrically connected to the pixel electrode through a switching transistor and to detect fingerprint information after a driving voltage is applied to the pixel electrode during a fingerprint-sensing mode period in a first area defined by N (N being a natural number of 1 or greater) gate lines among the H gate lines and the Q data lines among the K data lines, wherein the fingerprint-sensing mode period comprises a charging period and a sensing period;

during the charging period, the gate-driving circuit sequentially supplies a gate signal of a turn-on level voltage to the N gate lines, and the driving voltage supply circuit supplies the driving voltage to the Q data lines; and during the sensing period, the gate-driving circuit sequentially supplies a gate signal of a turn-on level voltage to the N gate lines, the driving voltage supply circuit supplies no driving voltage to the Q data lines, and the fingerprint-sensing circuit is electrically connected to the Q data lines to detect a signal from the Q data lines.

* * * * *